US012736984B2

(12) United States Patent
Chung et al.

(10) Patent No.: US 12,736,984 B2
(45) Date of Patent: Sep. 15, 2026

(54) ROBOT CLEANER AND CONTROLLING METHOD THEREOF

(71) Applicant: SAMSUNG ELECTRONICS CO., LTD., Suwon-si (KR)

(72) Inventors: Seongwook Chung, Suwon-si (KR); Woojin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/947,799

(22) Filed: Nov. 14, 2024

(65) Prior Publication Data

US 2025/0068182 A1 Feb. 27, 2025

Related U.S. Application Data

(63) Continuation of application No. PCT/KR2024/008433, filed on Jun. 19, 2024.

(30) Foreign Application Priority Data

Aug. 17, 2023 (KR) ........................ 10-2023-0107668

(51) Int. Cl.
*G05D 1/648* (2024.01)
*A47L 9/00* (2006.01)
(Continued)

(52) U.S. Cl.
CPC ............ *G05D 1/6484* (2024.01); *A47L 9/009* (2013.01); *A47L 9/2826* (2013.01); *A47L 9/2852* (2013.01);
(Continued)

(58) Field of Classification Search
CPC .. A47L 2201/04; A47L 11/24; A47L 2201/06; A47L 2201/22
See application file for complete search history.

(56) References Cited

U.S. PATENT DOCUMENTS 10,571,918 B2 2/2020 Xia et al.
10,852,729 B2 12/2020 Choi et al.
(Continued)

FOREIGN PATENT DOCUMENTS

JP 6757399 B2 9/2020
JP 2023-508078 A 2/2023
(Continued)

OTHER PUBLICATIONS

Translation of Jeon (Year: 2020).*
(Continued)

*Primary Examiner* — Kenneth J Malkowski
(74) *Attorney, Agent, or Firm* — Sughrue Mion, PLLC

(57) ABSTRACT

Provided is a robot cleaner includes: a sensor; at least one memory storing one or more instructions; and at least one processor, wherein the at least one processor, by executing the one or more instructions, is configured to identify a plurality of objects based on sensing data acquired through the sensor, identify a target object located on a travel surface of the robot cleaner among the plurality of objects, acquire power information indicating remaining power of the robot cleaner, determine whether to avoid the target object based on a result of comparing the power information with a threshold power value, based on the power information being less than the threshold power value, control the robot cleaner to travel to avoid the target object, based on the power information being greater than or equal to the threshold power value, acquire feature information of the target object based on the sensing data, acquire type information of the target object based on the feature information, based on the type information including a predetermined type, control the robot cleaner to travel to avoid the target object, and based on the type information not including the predetermined type, control the robot cleaner to travel based on a
(Continued)

movement path for moving the target object to a target location.

20 Claims, 28 Drawing Sheets

(51) Int. Cl.

| | |
|---|---|
| ***A47L 9/28*** | (2006.01) |
| ***A47L 11/40*** | (2006.01) |
| ***G05D 1/622*** | (2024.01) |
| *G05D 101/20* | (2024.01) |
| *G05D 105/10* | (2024.01) |

(52) U.S. Cl.
CPC ....... *A47L 11/4002* (2013.01); *A47L 11/4011* (2013.01); *A47L 11/4061* (2013.01); *G05D 1/622* (2024.01); *A47L 2201/04* (2013.01); *A47L 2201/06* (2013.01); *G05D 2101/20* (2024.01); *G05D 2105/10* (2024.01)

(56) References Cited

U.S. PATENT DOCUMENTS

| | | | | |
|---|---|---|---|---|
| 11,148,290 | B2 | 10/2021 | Kwak et al. | |
| 11,350,809 | B2 | 6/2022 | Hong et al. | |
| 11,442,465 | B2 | 9/2022 | Jeong et al. | |
| 11,493,933 | B2 | 11/2022 | Lee et al. | |
| 11,565,411 | B2 | 1/2023 | Kim et al. | |
| 11,586,211 | B2 | 2/2023 | Kim | |
| 2007/0096676 | A1 | 5/2007 | Im et al. | |
| 2018/0275666 | A1 | 9/2018 | Nakajima | |
| 2019/0072975 | A1 | 3/2019 | Choi | |
| 2020/0022552 | A1 | 1/2020 | Han et al. | |
| 2020/0205629 | A1* | 7/2020 | Hong | G05D 1/0212 |
| 2020/0329935 | A1* | 10/2020 | Park | A47L 11/4002 |
| 2023/0037747 | A1 | 2/2023 | Forsberg et al. | |
| 2025/0194878 | A1* | 6/2025 | Carswell | A47L 9/2847 |

FOREIGN PATENT DOCUMENTS

| | | | | |
|---|---|---|---|---|
| KR | 10-2009-0053983 A | | 5/2009 | |
| KR | 10-0963781 B1 | | 6/2010 | |
| KR | 10-2018-0087798 A | | 8/2018 | |
| KR | 10-2067603 B1 | | 1/2020 | |
| KR | 20200003312 A | * | 1/2020 | B25J 9/1679 |
| KR | 10 2020 0084449 A | | 7/2020 | |
| KR | 10 2020 0116187 A | | 10/2020 | |
| KR | 10 2021 0010274 A | | 1/2021 | |
| KR | 10-2330607 B1 | | 11/2021 | |
| KR | 10-2022-0006140 A | | 1/2022 | |
| KR | 10-2378602 B1 | | 3/2022 | |

OTHER PUBLICATIONS

International Search Report dated Sep. 20, 2024, issued by the International Searching Authority in International Application No. PCT/KR2024/008433.

Written Opinion dated Sep. 20, 2024, issued by the International Searching Authority in International Application No. PCT/KR2024/008433.

Communication issued on Apr. 29, 2026 by the European Patent Office in European Patent Application No. 24854287.0.

* cited by examiner 100
10

100
130
110
SENSOR
120
MEMORY
140
COMMUNICATION INTERFACE
PROCESSOR
MANIPULATION INTERFACE
150
DRIVER
160
SPEAKER
170
MICROPHONE
180

START
ACQUIRE SENSING DATA
S510
ACQUIRE FEATURE INFORMATION OF TARGET OBJECT
S520
DETERMINE WHETHER TO MOVE TARGET OBJECT
S530
DETERMINE MOVEMENT PATH OF TARGET OBJECT
S540
CHECK WHETHER TO MODIFY MOVEMENT PATH
S550
TRAVEL BASED ON MOVEMENT PATH
S560
END

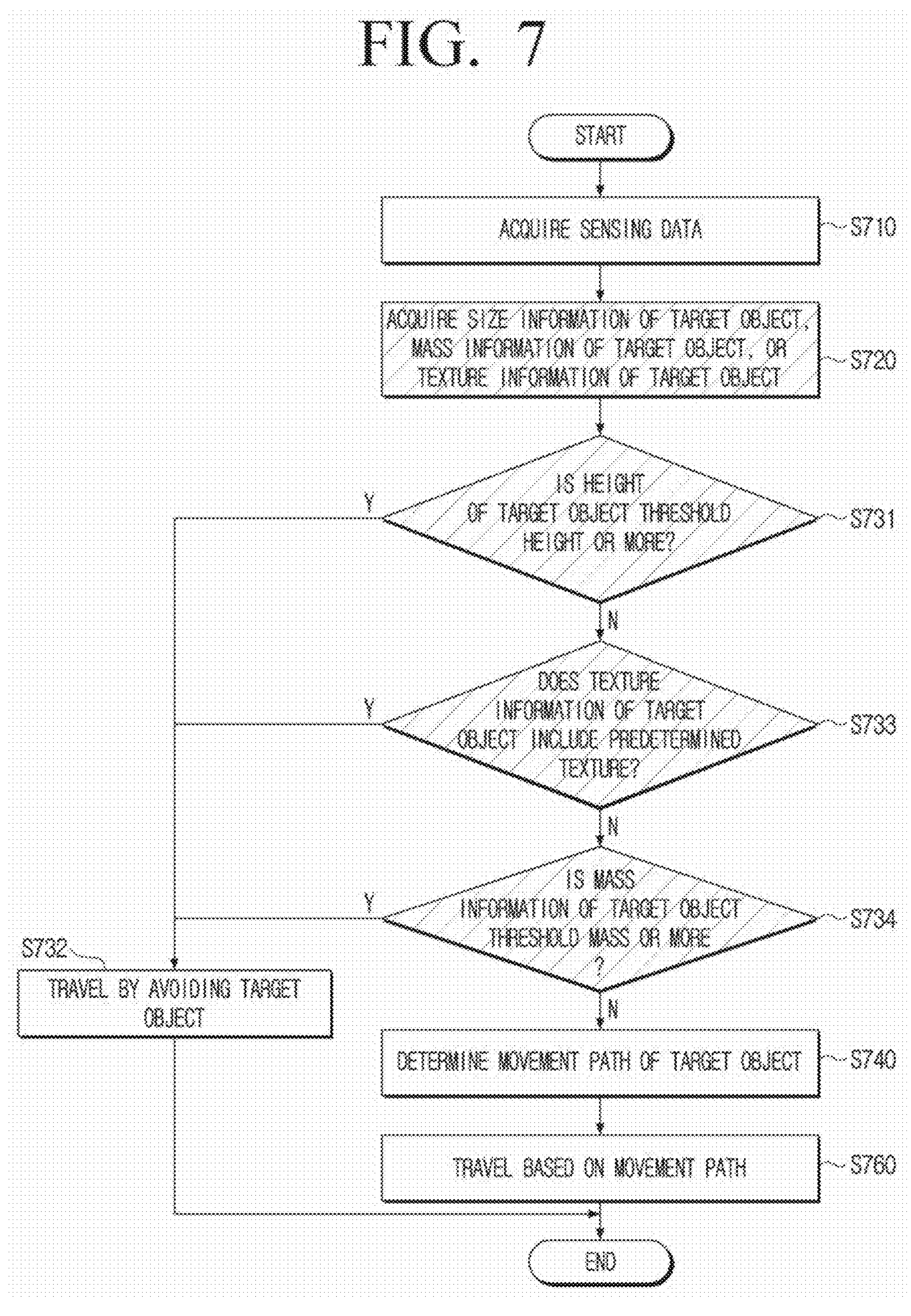
FIG. 7
START
ACQUIRE SENSING DATA
S710
ACQUIRE SIZE INFORMATION OF TARGET OBJECT, MASS INFORMATION OF TARGET OBJECT, OR TEXTURE INFORMATION OF TARGET OBJECT
S720
IS HEIGHT OF TARGET OBJECT THRESHOLD HEIGHT OR MORE?
S731
Y
N
DOES TEXTURE INFORMATION OF TARGET OBJECT INCLUDE PREDETERMINED TEXTURE?
S733
Y
N
IS MASS INFORMATION OF TARGET OBJECT THRESHOLD MASS OR MORE ?
S734
Y
N
S732
TRAVEL BY AVOIDING TARGET OBJECT
DETERMINE MOVEMENT PATH OF TARGET OBJECT
S740
TRAVEL BASED ON MOVEMENT PATH
S760
END

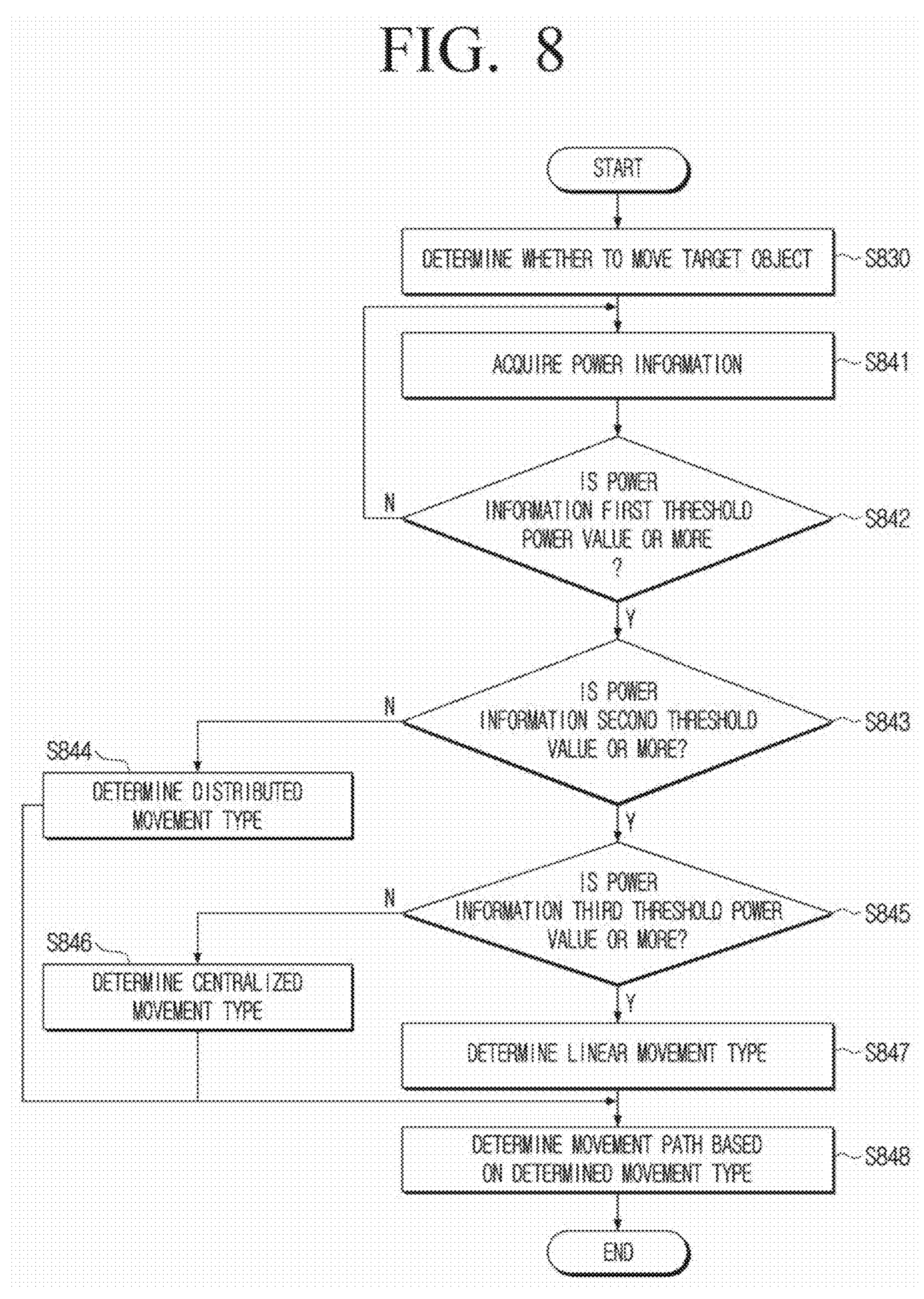
FIG. 8
START
DETERMINE WHETHER TO MOVE TARGET OBJECT
S830
ACQUIRE POWER INFORMATION
S841
IS POWER INFORMATION FIRST THRESHOLD POWER VALUE OR MORE ?
S842
N
Y
IS POWER INFORMATION SECOND THRESHOLD VALUE OR MORE?
S843
N
S844
DETERMINE DISTRIBUTED MOVEMENT TYPE
Y
IS POWER INFORMATION THIRD THRESHOLD POWER VALUE OR MORE?
S845
N
S846
DETERMINE CENTRALIZED MOVEMENT TYPE
Y
DETERMINE LINEAR MOVEMENT TYPE
S847
DETERMINE MOVEMENT PATH BASED ON DETERMINED MOVEMENT TYPE
S848
END 1412
1411
1413
1
100
11
1414
200
1415
1410
1412
1411
1413
1
11
200
100
1415
1420
1
1412
1411
1413
1
11
100
200
1430

START
DETERMINE MOVEMENT PATH OF TARGET OBJECT
S1540
ACQUIRE CLEANING PROGRESS LEVEL
S1551
IS CLEANING PROGRESS LEVEL THRESHOLD PROGRESS LEVEL OR MORE?
S1552
Y
N
IS TARGET LOCATION COMPLETELY CLEANED ?
S1553
N
TRAVEL TO CLEAN TARGET LOCATION BY EXCLUDING TARGET OBJECT
S1554
Y
TRAVEL TO MOVE TARGET OBJECT TO TARGET LOCATION
S1560
END 1711
1712
1
11
100
1710
1711
1
1712
11
1
100
1720

1811
1812
1813
11
100
1810
1812
1811
1813
11
100
1820
1812
1811
11
100
1830

1
11
2
12
4
14
3
13
1911
1912
1914
1913
1910
1900

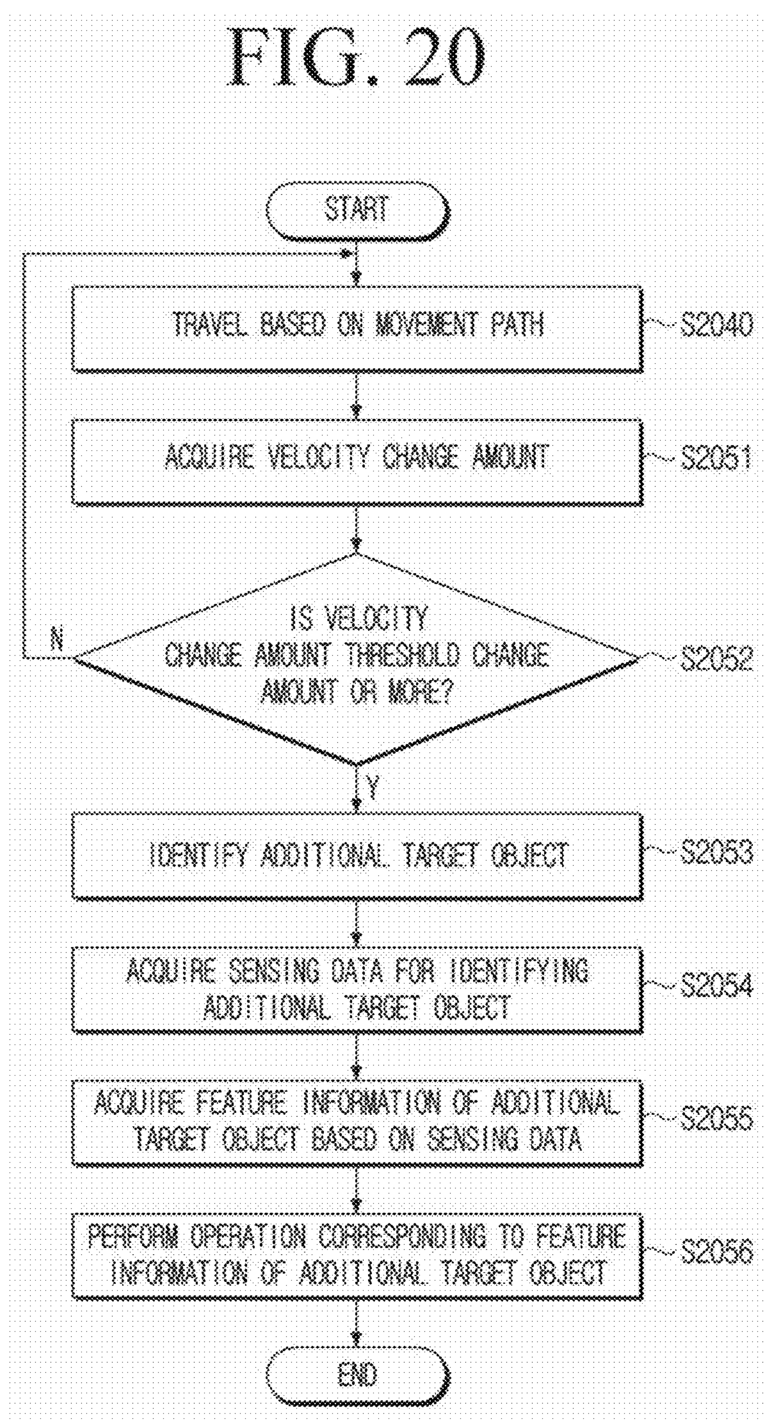
FIG. 20
START
TRAVEL BASED ON MOVEMENT PATH
S2040
ACQUIRE VELOCITY CHANGE AMOUNT
S2051
IS VELOCITY CHANGE AMOUNT THRESHOLD CHANGE AMOUNT OR MORE?
S2052
N
Y
IDENTIFY ADDITIONAL TARGET OBJECT
S2053
ACQUIRE SENSING DATA FOR IDENTIFYING ADDITIONAL TARGET OBJECT
S2054
ACQUIRE FEATURE INFORMATION OF ADDITIONAL TARGET OBJECT BASED ON SENSING DATA
S2055
PERFORM OPERATION CORRESPONDING TO FEATURE INFORMATION OF ADDITIONAL TARGET OBJECT
S2056
END

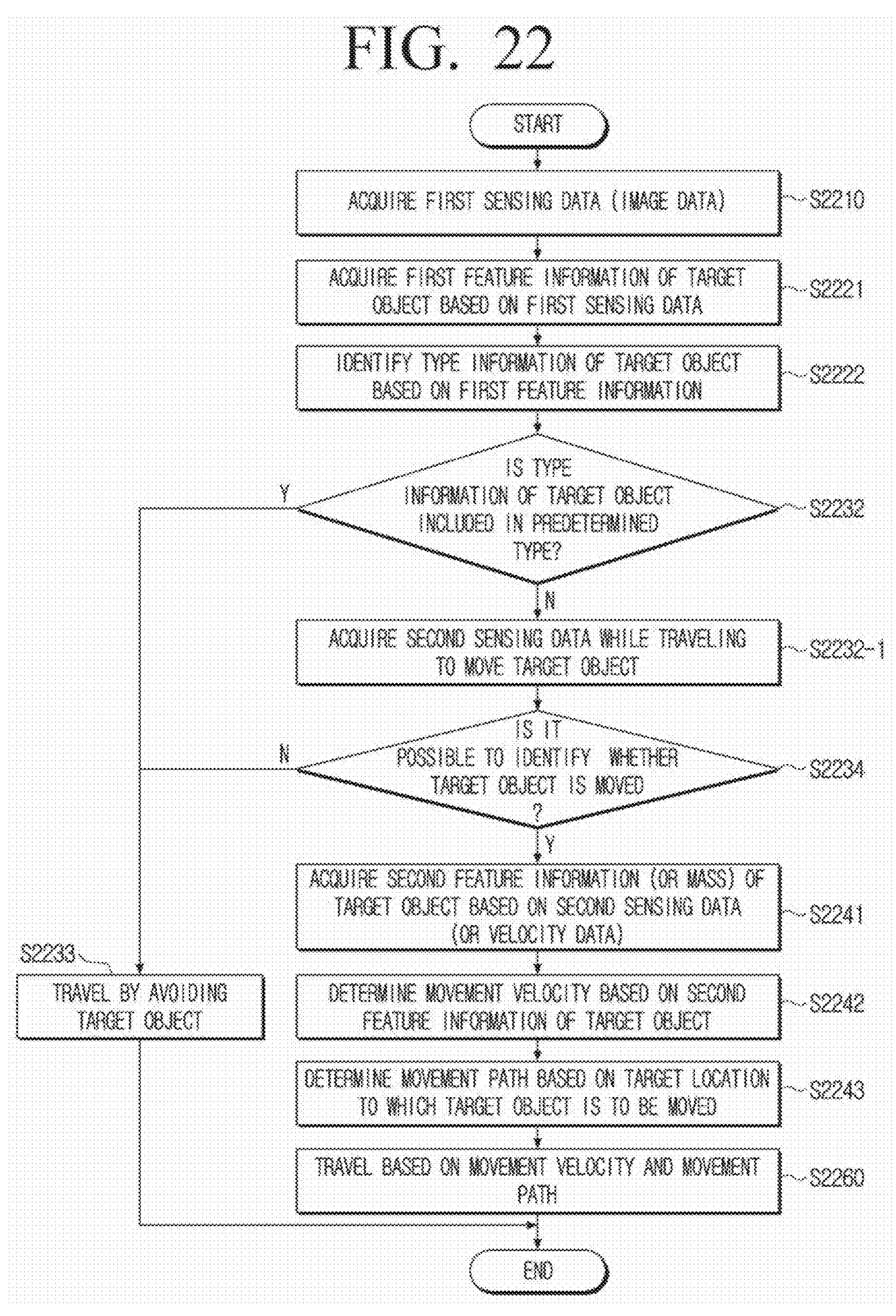
FIG. 22
START
ACQUIRE FIRST SENSING DATA (IMAGE DATA)
S2210
ACQUIRE FIRST FEATURE INFORMATION OF TARGET OBJECT BASED ON FIRST SENSING DATA
S2221
IDENTIFY TYPE INFORMATION OF TARGET OBJECT BASED ON FIRST FEATURE INFORMATION
S2222
IS TYPE INFORMATION OF TARGET OBJECT INCLUDED IN PREDETERMINED TYPE?
S2232
Y
N
ACQUIRE SECOND SENSING DATA WHILE TRAVELING TO MOVE TARGET OBJECT
S2232-1
IS IT POSSIBLE TO IDENTIFY WHETHER TARGET OBJECT IS MOVED ?
S2234
N
Y
ACQUIRE SECOND FEATURE INFORMATION (OR MASS) OF TARGET OBJECT BASED ON SECOND SENSING DATA (OR VELOCITY DATA)
S2241
S2233
TRAVEL BY AVOIDING TARGET OBJECT
DETERMINE MOVEMENT VELOCITY BASED ON SECOND FEATURE INFORMATION OF TARGET OBJECT
S2242
DETERMINE MOVEMENT PATH BASED ON TARGET LOCATION TO WHICH TARGET OBJECT IS TO BE MOVED
S2243
TRAVEL BASED ON MOVEMENT VELOCITY AND MOVEMENT PATH
S2260
END

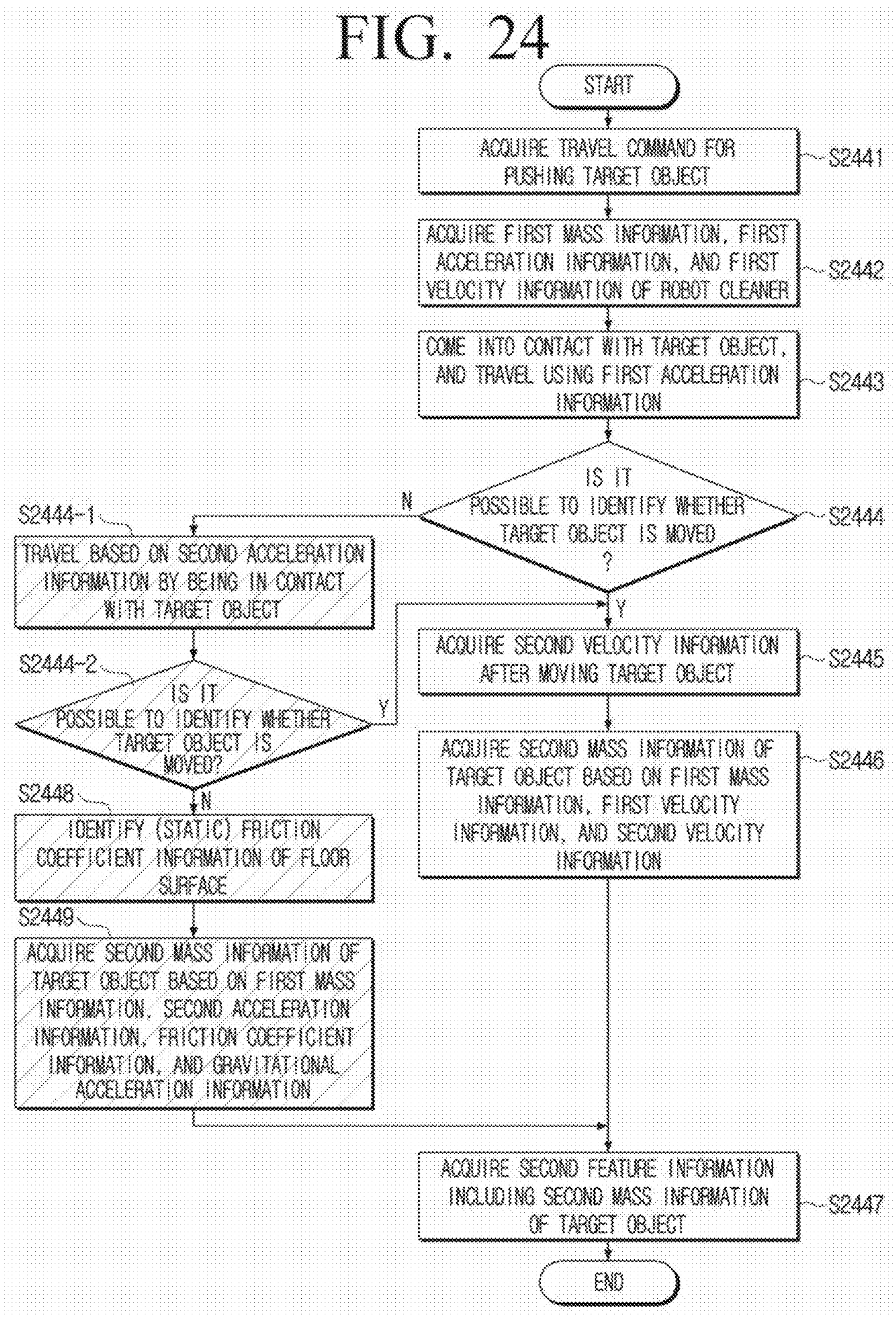
FIG. 24
START
ACQUIRE TRAVEL COMMAND FOR PUSHING TARGET OBJECT
S2441
ACQUIRE FIRST MASS INFORMATION, FIRST ACCELERATION INFORMATION, AND FIRST VELOCITY INFORMATION OF ROBOT CLEANER
S2442
COME INTO CONTACT WITH TARGET OBJECT, AND TRAVEL USING FIRST ACCELERATION INFORMATION
S2443
IS IT POSSIBLE TO IDENTIFY WHETHER TARGET OBJECT IS MOVED ?
S2444
N
Y
S2444-1
TRAVEL BASED ON SECOND ACCELERATION INFORMATION BY BEING IN CONTACT WITH TARGET OBJECT
S2444-2
IS IT POSSIBLE TO IDENTIFY WHETHER TARGET OBJECT IS MOVED?
Y
N
S2448
IDENTIFY (STATIC) FRICTION COEFFICIENT INFORMATION OF FLOOR SURFACE
S2449
ACQUIRE SECOND MASS INFORMATION OF TARGET OBJECT BASED ON FIRST MASS INFORMATION, SECOND ACCELERATION INFORMATION, FRICTION COEFFICIENT INFORMATION, AND GRAVITATIONAL ACCELERATION INFORMATION
ACQUIRE SECOND VELOCITY INFORMATION AFTER MOVING TARGET OBJECT
S2445
ACQUIRE SECOND MASS INFORMATION OF TARGET OBJECT BASED ON FIRST MASS INFORMATION, FIRST VELOCITY INFORMATION, AND SECOND VELOCITY INFORMATION
S2446
ACQUIRE SECOND FEATURE INFORMATION INCLUDING SECOND MASS INFORMATION OF TARGET OBJECT
S2447
END mr, V1
mo, Vo
mr+mo, Vc
100
10
100
10
2510
mr * V1 + mo * Vo = (mr + mo) * V2
2520
mr * V1 = (mr + mo) * V2 | V0 = 0
2530
mo= mr*(V1-V2) / V2
2540

F r
F o
100
10
2610
F r < F o
2620
F r < μ s * N
2630
m r * a r < μ s * m o * g
2640
W= m r * a r / μ s * g < m o
2650

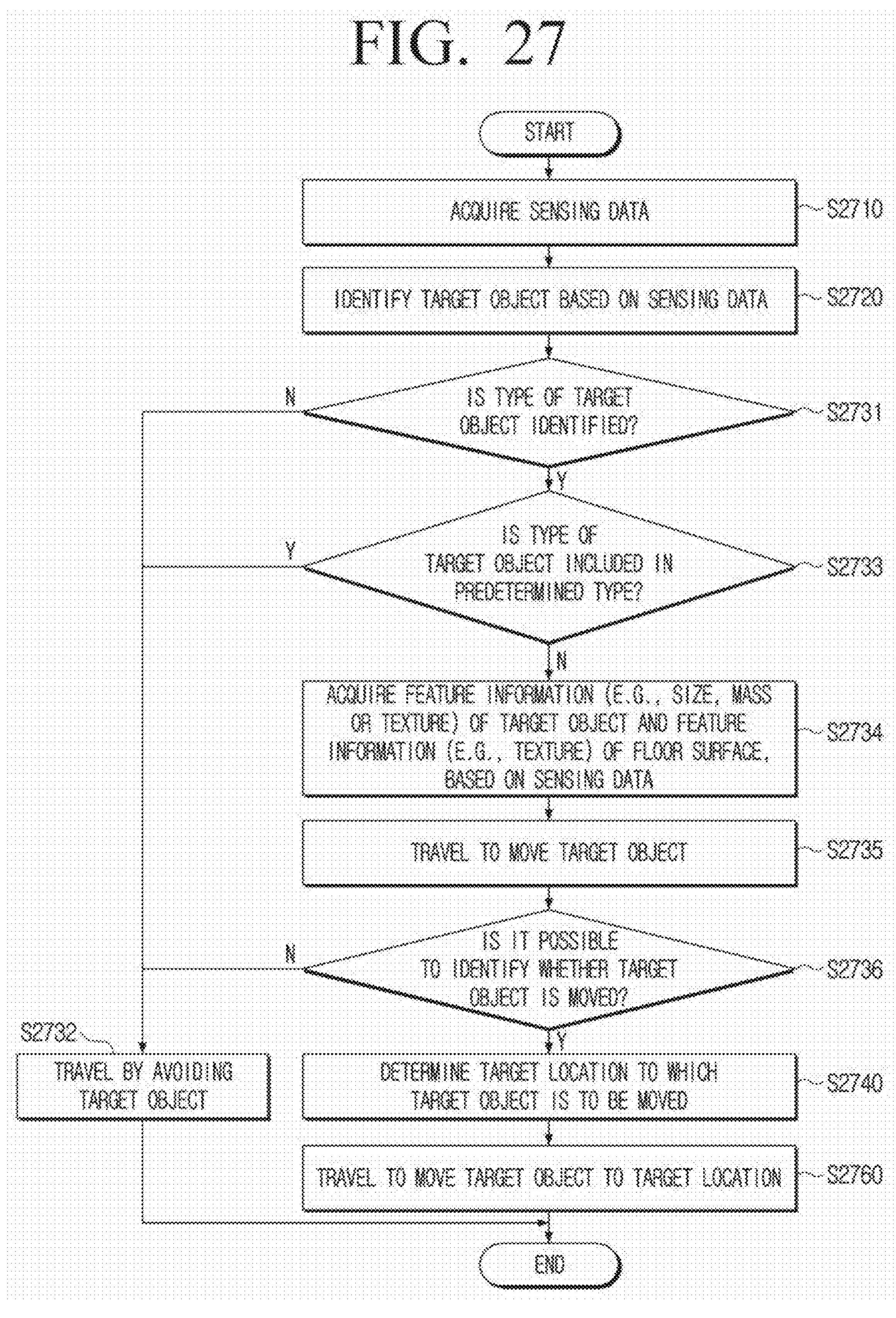
FIG. 27
START
ACQUIRE SENSING DATA
S2710
IDENTIFY TARGET OBJECT BASED ON SENSING DATA
S2720
IS TYPE OF TARGET OBJECT IDENTIFIED?
S2731
N
Y
IS TYPE OF TARGET OBJECT INCLUDED IN PREDETERMINED TYPE?
S2733
Y
N
ACQUIRE FEATURE INFORMATION (E.G., SIZE, MASS OR TEXTURE) OF TARGET OBJECT AND FEATURE INFORMATION (E.G., TEXTURE) OF FLOOR SURFACE, BASED ON SENSING DATA
S2734
TRAVEL TO MOVE TARGET OBJECT
S2735
IS IT POSSIBLE TO IDENTIFY WHETHER TARGET OBJECT IS MOVED?
S2736
N
Y
S2732
TRAVEL BY AVOIDING TARGET OBJECT
DETERMINE TARGET LOCATION TO WHICH TARGET OBJECT IS TO BE MOVED
S2740
TRAVEL TO MOVE TARGET OBJECT TO TARGET LOCATION
S2760
END

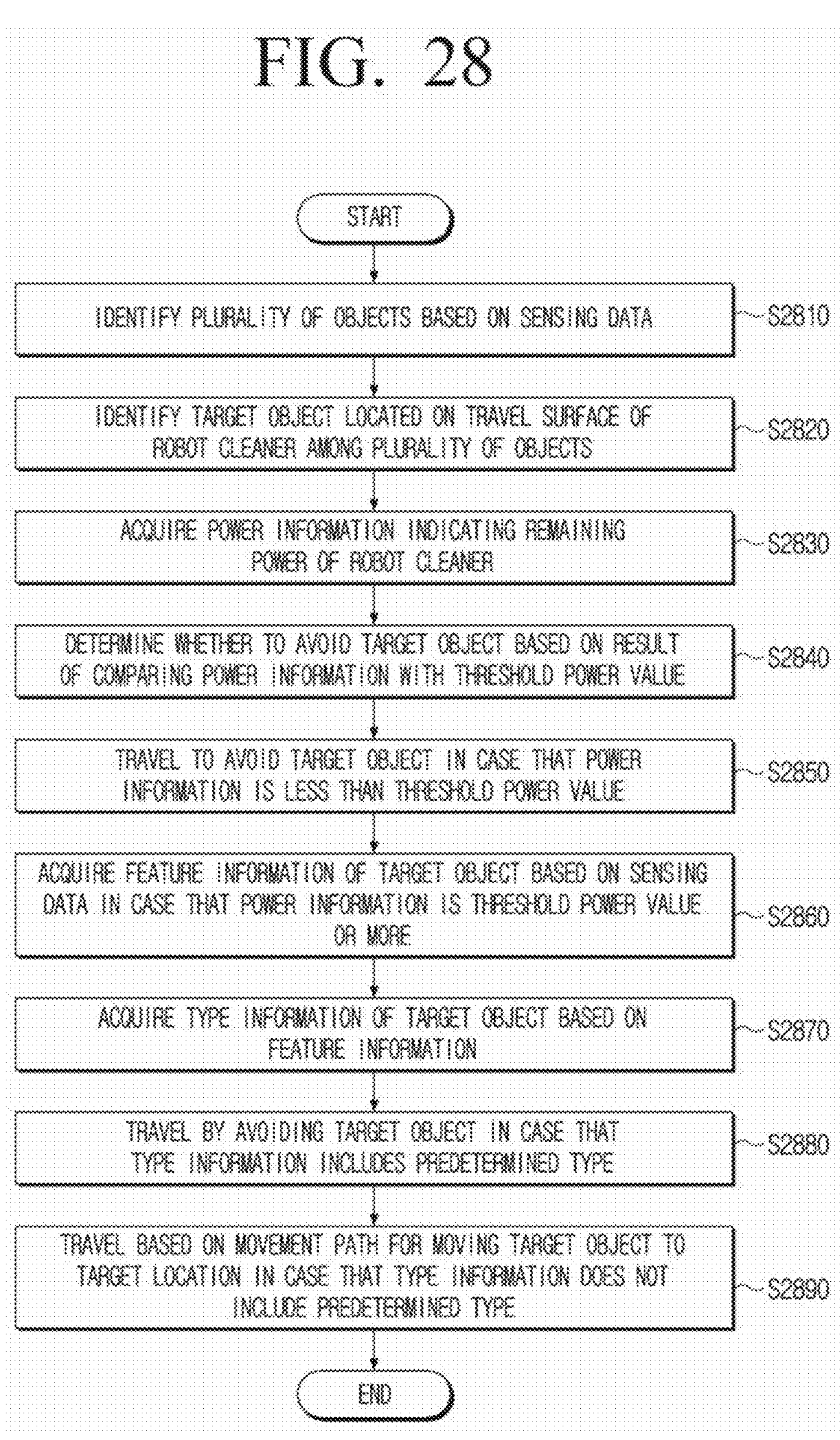
FIG. 28
START
IDENTIFY PLURALITY OF OBJECTS BASED ON SENSING DATA
S2810
IDENTIFY TARGET OBJECT LOCATED ON TRAVEL SURFACE OF ROBOT CLEANER AMONG PLURALITY OF OBJECTS
S2820
ACQUIRE POWER INFORMATION INDICATING REMAINING POWER OF ROBOT CLEANER
S2830
DETERMINE WHETHER TO AVOID TARGET OBJECT BASED ON RESULT OF COMPARING POWER INFORMATION WITH THRESHOLD POWER VALUE
S2840
TRAVEL TO AVOID TARGET OBJECT IN CASE THAT POWER INFORMATION IS LESS THAN THRESHOLD POWER VALUE
S2850
ACQUIRE FEATURE INFORMATION OF TARGET OBJECT BASED ON SENSING DATA IN CASE THAT POWER INFORMATION IS THRESHOLD POWER VALUE OR MORE
S2860
ACQUIRE TYPE INFORMATION OF TARGET OBJECT BASED ON FEATURE INFORMATION
S2870
TRAVEL BY AVOIDING TARGET OBJECT IN CASE THAT TYPE INFORMATION INCLUDES PREDETERMINED TYPE
S2880
TRAVEL BASED ON MOVEMENT PATH FOR MOVING TARGET OBJECT TO TARGET LOCATION IN CASE THAT TYPE INFORMATION DOES NOT INCLUDE PREDETERMINED TYPE
S2890
END

ROBOT CLEANER AND CONTROLLING METHOD THEREOF

CROSS-REFERENCE TO RELATED APPLICATIONS

This application is a bypass continuation of International Application No. PCT/KR2024/008433, filed on Jun. 19, 2024, which is based on and claims priority to Korean Patent Application No. 10-2023-0107668, filed on Aug. 17, 2023, in the Korean Intellectual Property Office, the disclosures of which are incorporated by reference herein in their entireties.

BACKGROUND

1. Field

The present disclosure relates to a robot cleaner and a controlling method thereof, and more particularly, to a robot cleaner which may move an object during its traveling and a controlling method thereof.

2. Description of Related Art

A robot cleaner may encounter various obstacles while performing its cleaning function. Most of the obstacles may be fixed objects, and the robot cleaner may thus avoid or go around the obstacles.

The object may be moved based on its type. In this case, the robot cleaner may perform an organizing function, thus providing a more convenient service to a user. The organizing function may be a service of moving the obstacle by using a predetermined method.

In a situation where the robot cleaner forcibly moves the obstacle, the obstacle may fall over or be damaged. There may also be a situation where it is difficult for the robot cleaner to forcibly move the obstacle. For example, in a situation where the obstacle is heavy, it may be difficult for the robot cleaner to move the obstacle, and more power may be consumed to move the obstacle.

SUMMARY

Provided is a robot cleaner which performs a cleaning function by analyzing an object and determining whether to avoid and/or move the object, and a controlling method thereof.

According to an aspect of the disclosure, a robot cleaner includes: a sensor; at least one memory storing one or more instructions; and at least one processor, wherein the at least one processor, by executing the one or more instructions, is configured to identify a plurality of objects based on sensing data acquired through the sensor, identify a target object located on a travel surface of the robot cleaner among the plurality of objects, acquire power information indicating remaining power of the robot cleaner, determine whether to avoid the target object based on a result of comparing the power information with a threshold power value, based on the power information being less than the threshold power value, control the robot cleaner to travel to avoid the target object, based on the power information being greater than or equal to the threshold power value, acquire feature information of the target object based on the sensing data, acquire type information of the target object based on the feature information, based on the type information including a predetermined type, control the robot cleaner to travel to avoid the target object, and based on the type information not including the predetermined type, control the robot cleaner to travel based on a movement path for moving the target object to a target location.

The at least one processor may, based on the type information not including the predetermined type, control the robot cleaner to travel according to a test mode where the robot cleaner comes into contact with the target object at a predetermined acceleration, and based on the robot cleaner moving the target object while traveling in the test mode, determine the movement path for moving the target object to the target location, and control the robot cleaner to travel based on a movement mode of moving the target object along the movement path.

The at least one processor may, based on the robot cleaner being unable to move the target object while traveling in the test mode, control the robot cleaner to travel to avoid the target object.

The feature information may include at least one of size information of the target object, mass information of the target object, or texture information of the target object, and the type information may include information regarding a possibility of moving the target object.

The size information may include a height of the target object, and the at least one processor may, based on the height of the target object being equal to or greater than a threshold height, identify the type information as including the predetermined type.

The mass information may include a mass of the target object, and the at least one processor may, based on the mass of the target object being greater than or equal to a threshold mass, identify the type information as including the predetermined type.

The texture information may include a texture of the target object, and the at least one processor may, based on the texture of the target object being a glass texture, identify the type information as comprising the predetermined type.

The movement path may a first movement path, and the at least one processor may, based on the power information being less than a threshold power level, control the robot cleaner to travel to move the target object to a temporary location, based on the target object being moved to the temporary location, control the robot cleaner to travel to a charging location without the target object, upon completion of a charging operation, change the first movement path to a second movement path to move the target object from the temporary location to the target location, and travel based on the second movement path.

The at least one processor may, identify a movement type corresponding to the power information from among a plurality of movement types stored in the at least one memory, and determine the target location based on the movement type.

The at least one processor may, based on the type information does not including the predetermined type, control the robot cleaner to travel to clean the movement path without the target object, and upon completion of cleaning the movement path, control the robot cleaner to travel to move the target object to the target location along the movement path.

According to an aspect of the disclosure, a method of controlling a robot cleaner includes identifying a plurality of objects based on sensing data, identifying a target object located on a travel surface of the robot cleaner among the plurality of objects, acquiring power information indicating remaining power of the robot cleaner, determining whether to avoid the target object based on a result of comparing the power information with a threshold power value, based on the power information being less than the threshold power value, traveling to avoid the target object, based on the power information being greater than or equal to the threshold power value, acquiring feature information of the target object based on the sensing data, acquiring type information of the target object based on the feature information, based on the type information including a predetermined type, traveling to avoid the target object, and based on the type information not including the predetermined type, traveling based on a movement path for moving the target object to a target location.

The method may include, based on the type information not including the predetermined type, traveling according to a test mode where the robot cleaner comes into contact with the target object at a predetermined acceleration, and based on the robot cleaner moving the target object while traveling in the test mode, determining the movement path for moving the target object to the target location, and traveling based on a movement mode of moving the target object along the movement path.

The method may include, based on the robot cleaner being unable to move the target object while traveling in the test mode, traveling to avoid the target object.

The feature information may include at least one of size information of the target object, mass information of the target object, or texture information of the target object, and the type information may include information regarding a possibility of moving the target object.

The size information may include a height of the target object, and the method may include based on the height of the target object being equal to or greater than a threshold height, identifying the type information as including the predetermined type.

The mass information may include a mass of the target object, and the method may include, based on the mass of the target object being greater than or equal to a threshold mass, identifying the type information as including the predetermined type.

The texture information may include a texture of the target object, and the method may include, based on the texture of the target object being a glass texture, identifying the type information as comprising the predetermined type.

The movement path may a first movement path, and the method may include, based on the power information being less than a threshold power level, traveling to move the target object to a temporary location, based on the target object being moved to the temporary location, traveling to a charging location without the target object, upon completion of a charging operation, changing the first movement path to a second movement path to move the target object from the temporary location to the target location, and traveling based on the second movement path.

The method may include, identifying a movement type corresponding to the power information from among a plurality of movement types stored in the robot cleaner, and determining the target location based on the movement type.

The method may include, based on the type information does not including the predetermined type, traveling to clean the movement path without the target object, and upon completion of cleaning the movement path, traveling to move the target object to the target location along the movement path.

BRIEF DESCRIPTION OF THE DRAWINGS

The above and other aspects and features of certain embodiments of the present disclosure will be more apparent from the following description taken in conjunction with the accompanying drawings, in which:

FIG. 7 is a flowchart for explaining an operation of determining whether to avoid the object according to an embodiment;

FIG. 8 is a flowchart for explaining the travel operation using power information according to an embodiment;

FIG. 20 is a flowchart for explaining an operation of identifying an additional object according to an embodiment;

FIG. 22 is a flowchart for explaining an operation of acquiring mass information of the object according to an embodiment;

FIG. 24 is a flowchart for explaining an operation of acquiring mass information of the object according to an embodiment;

FIG. 27 is a flowchart for explaining an operation of determining whether to move the object according to an embodiment; and FIG. 28 is a flowchart for explaining a controlling method of a robot cleaner according to an embodiment.

DETAILED DESCRIPTION

Figure 1:
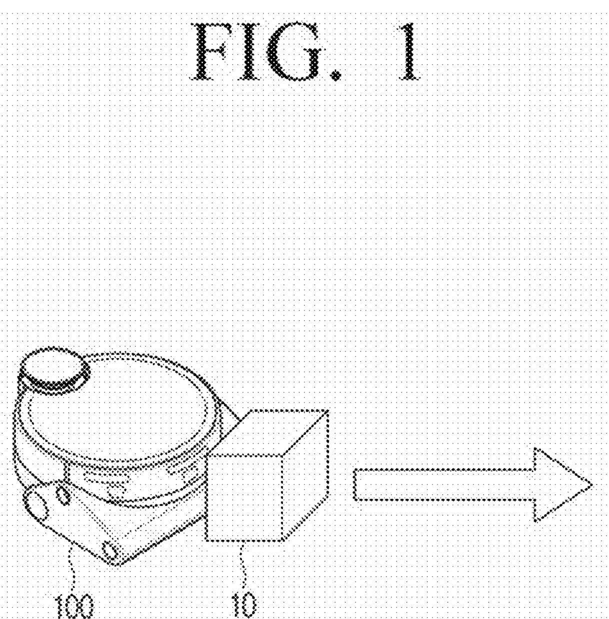
FIG. 1 is a diagram for explaining an operation of moving an object according to an embodiment.

Hereinafter, the present disclosure is described in detail with reference to the accompanying drawings.

General terms that are currently widely used are selected as terms used in embodiments of the present disclosure in consideration of their functions in the present disclosure, and may be changed based on the intentions of those skilled in the art or a judicial precedent, the emergence of a new technique, and the like. In addition, in a specific case, terms arbitrarily chosen by an applicant may exist. In this case, the meanings of such terms are mentioned in detail in corresponding description portions of the present disclosure. Therefore, the terms used in the present disclosure need to be defined on the basis of the meanings of the terms and the contents throughout the present disclosure rather than simple names of the terms.

In the specification, an expression "have", "may have", "include", "may include", or the like, indicates the existence of a corresponding feature (for example, a numerical value, a function, an operation or a component such as a part), and does not exclude the existence of an additional feature.

Herein, the expressions "at least one of a, b or c" and "at least one of a, b and c" indicate "only a," "only b," "only c," "both a and b," "both a and c," "both b and c," or "all of a, b, and c."

Expressions "first", "second", and the like, used in the specification may qualify various components regardless of the sequence or importance of the components. The expression is used only to distinguish one component from another component, and does not limit the corresponding component.

In case that any component (for example, a first component) is mentioned to be "(operatively or communicatively) coupled with/to" or "connected to another component (for example, a second component), it is to be understood that any component may be directly coupled to another component or may be coupled to another component through still another component (for example, a third component).

A term of a singular number used herein is intended to include its plural number unless explicitly indicated otherwise. It is to be understood that a term "include" or "formed of" used in the specification specifies the presence of features, numerals, steps, operations, components, parts, or combinations thereof, which is mentioned in the specification, and does not preclude the presence or addition of one or more other features, numerals, steps, operations, components, parts, or combinations thereof.

In the present disclosure, a "module" or a "~er/~or" may perform at least one function or operation, and be implemented by hardware, software, or a combination of hardware and software. In addition, a plurality of "modules" or a plurality of "~ers/~ors" may be integrated in at least one module to be implemented by at least one processor except for a "module" or a "~er/or" that needs to be implemented by specific hardware.

In the present disclosure, a term "user" may refer to a person who uses an electronic device or a device (e.g., artificial intelligence robot cleaner) which uses an electronic device. Hereinafter, the embodiments of the present disclosure are described in detail with reference to the accompanying drawings.

FIG. 1 is a diagram for explaining an operation of moving a target object 10 according to an embodiment.

Referring to FIG. 1, a robot cleaner 100 may be a mobile device. The robot cleaner 100 may be a device moved based on a predetermined method. The robot cleaner 100 may be a mobile robot. The robot cleaner 100 may be the mobile robot performing travel based on the predetermined method. The robot cleaner 100 may be described as a robot cleaner or a mobile robot cleaner. The robot cleaner 100 may be described as the mobile device.

For example, the robot cleaner 100 may be a mobile cleaning robot. The robot cleaner 100 may travel along a movement path to perform a cleaning operation for a space where the robot cleaner 100 is located.

The robot cleaner 100 may identify the target object 10 during its travel. The target object 10 may be a predetermined object. The target object 10 may be an obstacle object. The target object 10 may be an object required to be moved by the robot cleaner 100. The robot cleaner 100 may move the target object 10 by using a physical force.

Figure 2:
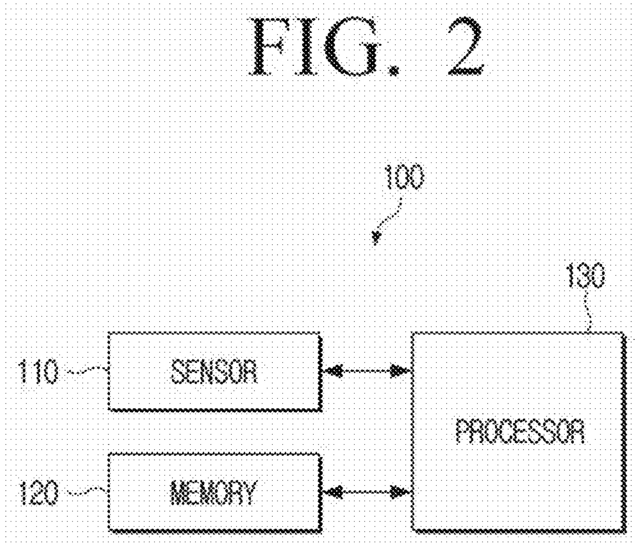
FIG. 2 is a block diagram for explaining a configuration of a robot cleaner according to an embodiment.

FIG. 2 is a block diagram for explaining a configuration of the robot cleaner 100 according to an embodiment.

The robot cleaner 100 may include at least one of a sensor 110, a memory 120, or at least one processor 130.

The robot cleaner 100 may be described as a mobile electronic device or an electronic device for controlling the mobile device. For example, the robot cleaner 100 may include a mobile robot which may travel or a device for controlling the mobile robot. In addition, the robot cleaner 100 may be a server performing an analysis operation for controlling device travel.

According to various embodiments, the robot cleaner 100 may be the mobile cleaning robot performing the cleaning operation.

Here, the sensor 110 may sense sensing data. The sensor 110 may include at least one sensor. Here, at least one sensor may be one of a light detection and ranging (LiDAR) sensor sensing a location, an image sensor capturing an image, or an acceleration sensor (or gyro sensor) sensing a rotation angle.

According to the various embodiments, one sensor may sense all of the location, the image, the rotation angle, or the like.

Here, the memory 120 may store the sensing data or processed sensing data. Here, the processed sensing data may be described as mapping data. The memory 120 may store the mapping data. In addition, new data may be added to or some data may be deleted from the memory 120.

The processor 130 may control overall operations of the robot cleaner by using the components included in the robot cleaner. In detail, the processor 130 may function to control the overall operations of the robot cleaner.

At least one processor 130 may identify a plurality of objects based on the sensing data acquired through the sensor 110, and identify the target object located on a travel surface of the robot cleaner 100 among the plurality of objects.

At least one processor 130 may acquire power information indicating remaining power of the robot cleaner 100.

At least one processor 130 may determine whether to avoid the target object based on a result of comparing the power information with a threshold (or critical) power value. At least one processor 130 may control the robot cleaner to travel to avoid the target object in case that the power information is less than the threshold power value. At least one processor 130 may acquire feature information of the target object based on the sensing data in case that the power information is the threshold power value or more.

At least one processor 130 may acquire type information of the target object based on the feature information. At least one processor 130 may travel by avoiding the target object in a case where the type information includes a predetermined type. At least one processor 130 may control the robot cleaner to travel based on the movement path for moving the target object to a target location in a case where the type information does not include the predetermined type.

At least one processor 130 may acquire the sensing data through the sensor 110. The sensor 110 may include a sensor for identifying the object. The sensing data may include data for identifying the object.

For example, the sensor 110 may include the image sensor. At least one processor 130 may acquire image data (or image information) by using the image sensor of the sensor 110. The image sensor may include a red-green-blue (RGB) camera, a depth camera, an infrared camera, or the like.

As an example, the sensor 110 may include the LiDAR sensor. At least one processor 130 may acquire LiDAR data (or LiDAR information) by using the LiDAR sensor of the sensor 110.

Types of sensing data are not limited to the examples described above, and various sensors may be used to identify the object.

At least one processor 130 may identify the plurality of objects existing around the robot cleaner 100 through the sensing data. The plurality of objects may include all objects that may be identified through the sensing data.

At least one processor 130 may select the object for the processor to determine whether to avoid or move among the plurality of objects.

For example, the processor may not need to determine whether to avoid or move the object having a high possibility of being fixed, such as a dining table, a wall, a shelf, or the like. This object may naturally be the object that is to be avoided.

For example, the processor may need to determine whether to avoid or move the object having a possibility of being moved, such as a toy, a cup, a box, or the like. The reason is that the processor needs to perform a function of moving the object by using the robot cleaner 100.

The processor may need to select the target object among the plurality of objects. The reason is that analyzing an object having no possibility of being moved in the first place may lower data processing efficiency. At least one processor 130 may determine the object having a possibility of being moved as the target object 10. At least one processor 130 may determine, as the target object 10, an object having a possibility of being moved among the plurality of objects identified based on the sensing data. The target object 10 may include at least one object.

At least one processor 130 may determine the target object 10 based on the object located on the travel surface of the robot cleaner 100 among the plurality of objects. The travel surface may include a plane on the movement path based on which the robot cleaner 100 is moved. The travel surface may be described as a travel plane, a travel floor, a plane of the movement path, or the like.

The power information may include information related to power or electric power for driving the robot cleaner 100. The power information may include a power value charged from the robot cleaner 100. The power information may include a remaining power value of the robot cleaner 100. The power information may be described as battery information, remaining battery information, remaining power information, or the like.

At least one processor 130 may acquire current power information of the robot cleaner 100. At least one processor 130 may acquire the power information in case of identifying the target object 10. At least one processor 130 may compare the power information with the threshold power value. At least one processor 130 may determine whether to move the target object 10 based on the comparison result acquired by comparing the power information with the threshold power value.

At least one processor 130 may determine whether to avoid the target object 10 based on the comparison result. At least one processor 130 may determine not to avoid the target object 10 in a case where the power information is the threshold power value or more. At least one processor 130 may determine to control the robot cleaner 100 to avoid the target object 10 in a case where the power information is less than the threshold power value. At least one processor 130 may control the robot cleaner to travel to avoid the target object 10. A reference path based on which the robot cleaner 100 is moved before discovering the target object 10 may be a first movement path. At least one processor 130 may change the first movement path to a second movement path in case of identifying the target object 10. The movement path may be described as the first movement path, the second movement path, a third movement path, or the like based on whether the movement path described in the description below is changed or modified. Each ordinal number may indicate the number of changes to an initial movement path rather than a specific movement path.

At least one processor 130 may change the first movement path to the second movement path to avoid the target object 10 in a case where the power information is less than the threshold power value.

At least one processor 130 may determine whether to move the target object 10 without avoiding the target object 10 in a case where the power information is the threshold power value or more.

At least one processor 130 may determine whether to move the target object 10 by analyzing the feature information of the target object 10. At least one processor 130 may acquire the feature information of the target object 10 based on the sensing data.

The feature information may include information indicating characteristics of the target object 10. Characteristic information may include at least one of size information, mass information, or texture information.

At least one processor 130 may acquire detailed data corresponding to the target object 10 by using the characteristic information. At least one processor 130 may identify the type information of the target object 10 based on the feature information.

The type information may include information where the object is classified into a predetermined category.

For example, the type information may include movable and non-movable types. The type information of a wall object may be the non-movable type, and a toy object may be the movable type.

For example, the type information may include fragile and non-fragile types. The object having a glass texture may be the fragile type, and the object having a plastic texture may be the non-fragile type.

The type information may include at least one type. The type information of the target object 10 may be the plurality of types. At least one processor 130 may determine whether the type information of the target object 10 includes the predetermined type.

The predetermined type may be described as an avoidance type. The predetermined type may include a type required to be avoided because the target object 10 itself is impossible to be moved.

At least one processor 130 may classify a mode of the robot cleaner into a travel mode, a test mode, or a movement mode. The travel mode may be described as a first mode. The test mode may be described as a second mode. The movement mode may be described as a third mode.

The travel mode may be a mode of driving the robot cleaner 100 with a first force (or first acceleration) and/or at a first velocity.

The travel mode may be a mode where the robot cleaner is moved while performing the cleaning operation. The travel mode may be a mode where the robot cleaner is moved without the target object 10.

The test mode may be a mode of driving the robot cleaner 100 with a second force (or second acceleration) and/or at a second velocity.

The test mode may be a mode where the robot cleaner performs an operation of pushing the target object 10 with a predetermined force (or acceleration). The test mode may be a mode where the robot cleaner applies the predetermined force (or acceleration) to the target object 10 to determine whether to move the target object 10 rather than a mode of moving the target object 10 to the target location.

The movement mode may be a mode of driving the robot cleaner 100 with a third force (or third acceleration) and/or at a third velocity.

The movement mode may be a mode where the robot cleaner 100 is moved together with the target object 10. The movement mode may be a mode where the robot cleaner 100 is moved to directly move the target object 10.

According to an embodiment, the third force (or the third velocity) may be greater than the first force (or the first velocity). The robot cleaner may need a relatively greater force to move the target object 10.

According to an embodiment, the third force (or the third velocity) may be greater than the second force (or the second velocity). The second force (or the second velocity) may be less than the third force (or the third velocity) in that a test operation is only an operation to determine whether to move the target object 10.

In other implementations, the third force (or the third velocity) may be the same as the second force (or the second velocity). Times for applying the force may be different in the test mode and the movement mode. In the test mode, the robot cleaner may apply the force to the target object 10 only for a predetermined time.

According to an embodiment, the second force (or the second velocity) may be less than the first force (or the first velocity). The force may be applied to the target object 10 in the test mode. Therefore, at least one processor 130 may drive the robot cleaner 100 by using a greater force than the travel mode.

In other implementations, the second force (or the second velocity) may be the same as the first force (or the first velocity). At least one processor 130 may be operated in the test mode to determine whether to move the target object 10. At least one processor 130 may drive the robot cleaner 100 with the same force in the test mode and the travel mode.

At least one processor 130 may travel based on the test mode where the robot cleaner comes into contact with the target object with a predetermined acceleration in a case where the type information does not include the predetermined type. At least one processor 130 may be operated in the travel mode before identifying the target object 10. At least one processor 130 may change the travel mode to the test mode in a case where the type information does not include the predetermined type.

At least one processor 130 may determine the movement path for moving the target object to the target location, and travel based on the movement mode of moving the target object along the movement path in a case where the target object is moved based on the test mode. At least one processor 130 may change the test mode to the movement mode.

At least one processor 130 may travel by avoiding the target object in a case where the target object is not moved based on the test mode.

The target object 10 may not be moved even though the second force is applied to the target object 10 in the test mode. The reason is that the target object 10 has a large mass. At least one processor 130 may travel by avoiding the target object 10.

At least one processor 130 may acquire the feature information including at least one of the size information, mass information, or texture information of the target object based on the sensing data, and acquire the type information for determining a movement possibility of the target object based on the feature information.

At least one processor 130 may identify the type information as the non-movable type in a case where a height of the target object is a threshold height or more based on the size information of the target object, and the predetermined type may include the non-movable type.

At least one processor 130 may identify the type information as the non-movable type in a case where a mass of the target object is a threshold mass or more based on the mass information of the target object, and the predetermined type may include the non-movable type.

At least one processor 130 may identify the type information as the non-movable type in a case where the target object is identified as having the glass texture based on the texture information of the target object, and the predetermined type may include the non-movable type.

The movement path may be the first movement path, and at least one processor 130 may acquire the power information indicating the remaining power of the robot cleaner 100. At least one processor 130 may travel to move the target object to a temporary location in a case where the power information is less than the threshold power value. At least one processor 130 may travel to a charging location without the target object in a case where the target object is moved to the temporary location. At least one processor 130 may change the first movement path to the second movement path to move the target object from the temporary location to the target location in a case where charging is completed. At least one processor 130 may travel based on the second movement path. A description thereof is described with reference to FIGS. 13 and 14.

An initial cleaning travel path may be described as the first movement path. In this case, the first movement path not considering the temporary location may be described as the second movement path, and the second movement path considering the temporary location may be described as the third movement path. The ordinal number of the movement path may be changed based on a step.

The robot cleaner 100 may include the memory 120 storing a plurality of movement types. At least one processor 130 may acquire the power information indicating the remaining power of the robot cleaner 100. At least one processor 130 may determine the movement type corresponding to the power information among the plurality of movement types. At least one processor 130 may determine the target location based on the movement type. A description thereof is described with reference to FIGS. 8 to 12.

At least one processor 130 may travel to clean the movement path without the target object, and travel to move the target object to the target location based on the movement path completely cleaned. A description thereof is described with reference to FIGS. 15 and 18.

The sensing data may be first sensing data, and the target object may be a first target object. At least one processor 130 may acquire a velocity change amount of the robot cleaner. At least one processor 130 may stop the movement of the target object in a case where the velocity change amount is reduced to a threshold change amount or more. At least one processor 130 may travel from a first location where the robot cleaner is located without the target object to a second location within a threshold distance. At least one processor 130 may acquire second sensing data sensing a direction of the target object at the second location through the sensor 110. At least one processor 130 may identify a second target object based on the second sensing data. At least one processor 130 may acquire the feature information of the second target object based on the second sensing data in case of identifying the second target object. At least one processor 130 may determine whether to move the second target object based on the feature information of the second target object. A description thereof is described with reference to FIGS. 20 and 21.

According to an embodiment, at least one processor 130 may identify the plurality of objects, identify the target object located on the travel surface of the robot cleaner among the plurality of objects, and acquire the feature information of the target object, based on the sensing data acquired through the sensor 110. At least one processor 130 may identify the type information of the target object based on the feature information of the target object. At least one processor 130 may travel by avoiding the target object in a case where the type information includes the predetermined type. At least one processor 130 may travel to move the target object in a case where the type information does not include the predetermined type. At least one processor 130 may determine the movement path to move the target object to the target location and control the robot cleaner to travel based on the movement path in a case where the target object is moved.

At least one processor 130 may travel by avoiding the target object in a case where the target object is not moved.

At least one processor 130 may acquire the feature information including at least one of the size information, the mass information, or the texture information of the target object based on the sensing data, and acquire the type information for determining the movement possibility of the target object based on the feature information.

The robot cleaner 100 may automatically move the target object 10 to clean a cleaning space more thoroughly. The reason is that the robot cleaner 100 may perform the cleaning operation up to a location where the target object 10 is located. The robot cleaner 100 may move the target object 10 on the travel path to a predetermined location. The robot cleaner 100 may provide a user with convenience of not having to directly clean up the target object 10 himself/herself.

Figure 3:
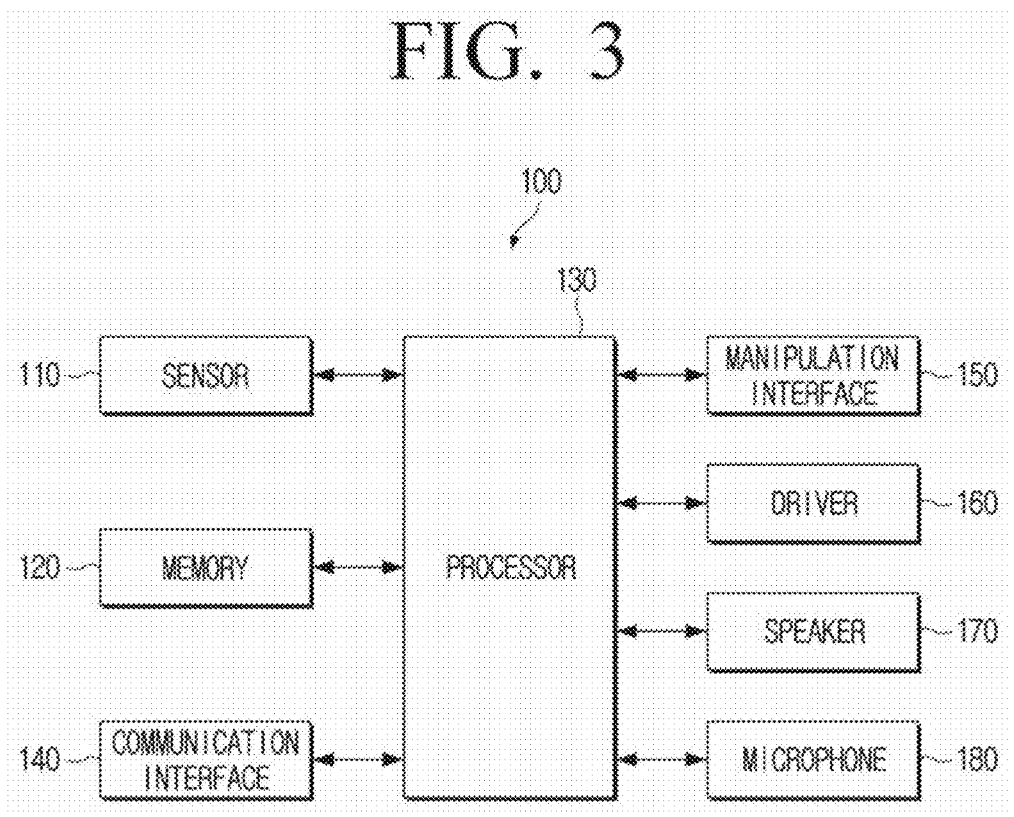
FIG. 3 is a block diagram for explaining a specific configuration of the robot cleaner of FIG. 2.

FIG. 3 is a block diagram for explaining a specific configuration of the robot cleaner 100 of FIG. 2.

Referring to FIG. 3, the robot cleaner 100 may include at least one of the sensor 110, the memory 120, at least one processor 130, a communication interface 140, a manipulation interface 150, a driver 160, a speaker 170, or a microphone 180.

Redundant description are omitted with regard to the same operations as those described above among the operations of the sensor 110, the memory 120, and at least one processor 130.

The memory 120 may be implemented as an internal memory such as a read-only memory (ROM, e.g., electrically erasable programmable read-only memory (EEPROM)) or a random access memory (RAM), included in the processor 130, or as a memory separate from the processor 130. In this case, the memory 120 may be implemented in the form of a memory embedded in the robot cleaner 100 or in the form of a memory detachable from the robot cleaner 100, based on a data storage purpose. For example, data for driving the robot cleaner 100 may be stored in the memory embedded in the robot cleaner 100, and data for an extended function of the robot cleaner 100 may be stored in the memory detachable from the robot cleaner 100.

The memory embedded in the robot cleaner 100 may be implemented as at least one of a volatile memory (e.g., dynamic RAM (DRAM), static RAM (SRAM) or synchronous dynamic RAM (SDRAM)) or a non-volatile memory (e.g., one time programmable ROM (OTPROM), programmable ROM (PROM), erasable and programmable ROM (EPROM), electrically erasable and programmable ROM (EEPROM), a mask ROM, a flash ROM, a flash memory (e.g., NAND flash or NOR flash), a hard drive, or a solid state drive (SSD)); and the memory detachable from the robot cleaner 100 may be implemented as a memory card (e.g., compact flash (CF), secure digital (SD)), micro secure digital (Micro-SD), mini secure digital (mini-SD), extreme digital (xD) or multi-media card (MMC)), an external memory which may be connected to a universal serial bus (USB) port (e.g., USB memory), or the like.

The processor 130 may be implemented as a digital signal processor (DSP) that processes a digital signal, a microprocessor, or a time controller (TCON). However, at least one processor 130 is not limited thereto, and may include at least one of a central processing unit (CPU), a micro controller unit (MCU), a micro processing unit (MPU), a controller, an application processor (AP), a graphics-processing unit (GPU), a communication processor (CP), or an advanced reduced instruction set computer (RISC) machine (ARM) processor, or may be defined by these terms. In addition, the processor 130 may be implemented in a system-on-chip (SoC) or a large scale integration (LSI), in which a processing algorithm is embedded, or may be implemented in the form of a field programmable gate array (FPGA). In addition, the processor 130 may perform various functions by executing computer executable instructions stored in the memory.

The communication interface 140 is a component communicating with various types of external devices by using various types of communication methods. The communication interface 140 may include a wireless communication module or a wired communication module. Here, each communication module may be implemented in the form of at least one hardware chip.

The wireless communication module may be a module communicating with the external device in a wireless manner. For example, the wireless communication module may include at least one of a wireless-fidelity (Wi-Fi) module, a Bluetooth module, an infrared communication module, or other communication modules.

The Wi-Fi module and the Bluetooth module may respectively perform communication in a Wi-Fi manner and a Bluetooth manner. In case of using the Wi-Fi module or the Bluetooth module, the communication interface may first transmit and receive various connection information such as a service set identifier (SSID), a session key, or the like, connect the communication by using this connection information, and then transmit and receive various information.

The infrared communication module may perform the communication based on infrared data association (IrDA) technology that wirelessly transmits data in a short distance by using an infrared ray between a visible ray and millimeter waves.

In addition to the above-described communication manners, other communication modules may include at least one communication chip performing the communication based on various wireless communication standards such as zigbee, third generation (3G), third generation partnership project (3GPP), long term evolution (LTE), LTE advanced (LTE-A), fourth generation (4G), and fifth generation (5G).

The wired communication module may be a module communicating with the external device in the wired manner. For example, the wired communication module may include at least one of a local area network (LAN) module, an Ethernet module, a pair cable, a coaxial cable, an optical fiber cable, or an ultra-wide-band (UWB) module.

The manipulation interface 150 may be implemented as a device such as a button, a touch pad, a mouse or a keyboard, or may be implemented as a touch screen capable of also performing a manipulation input function in addition to the above-described display function. Here, the button may be any of various types of buttons such as a mechanical button, a touch pad, a wheel or the like, which is disposed in any region, such as the front surface portion, side surface portion, or rear surface portion, of a body appearance of the robot cleaner 100.

The driver 160 may be a component generating and transmitting the physical force that controls the travel of the robot cleaner 100. The driver 160 may include a motor.

The speaker 170 may be a component outputting not only various audio data but also various notification sounds, voice messages, or the like.

The microphone 180 may be a component receiving a user voice or other sounds and converting the same to the audio data. The microphone 180 may receive the user voice while activated. For example, the microphone 180 may be formed integrally with the robot cleaner 100 in its upper, front, or side direction. The microphone 180 may include various components such as a microphone collecting the user voice in an analog form, an amplifier circuit amplifying the collected user voice, an analog to digital (A/D) conversion circuit sampling the amplified user voice and converting the same to a digital signal, and a filter circuit removing a noise component from the converted digital signal.

Figure 4:
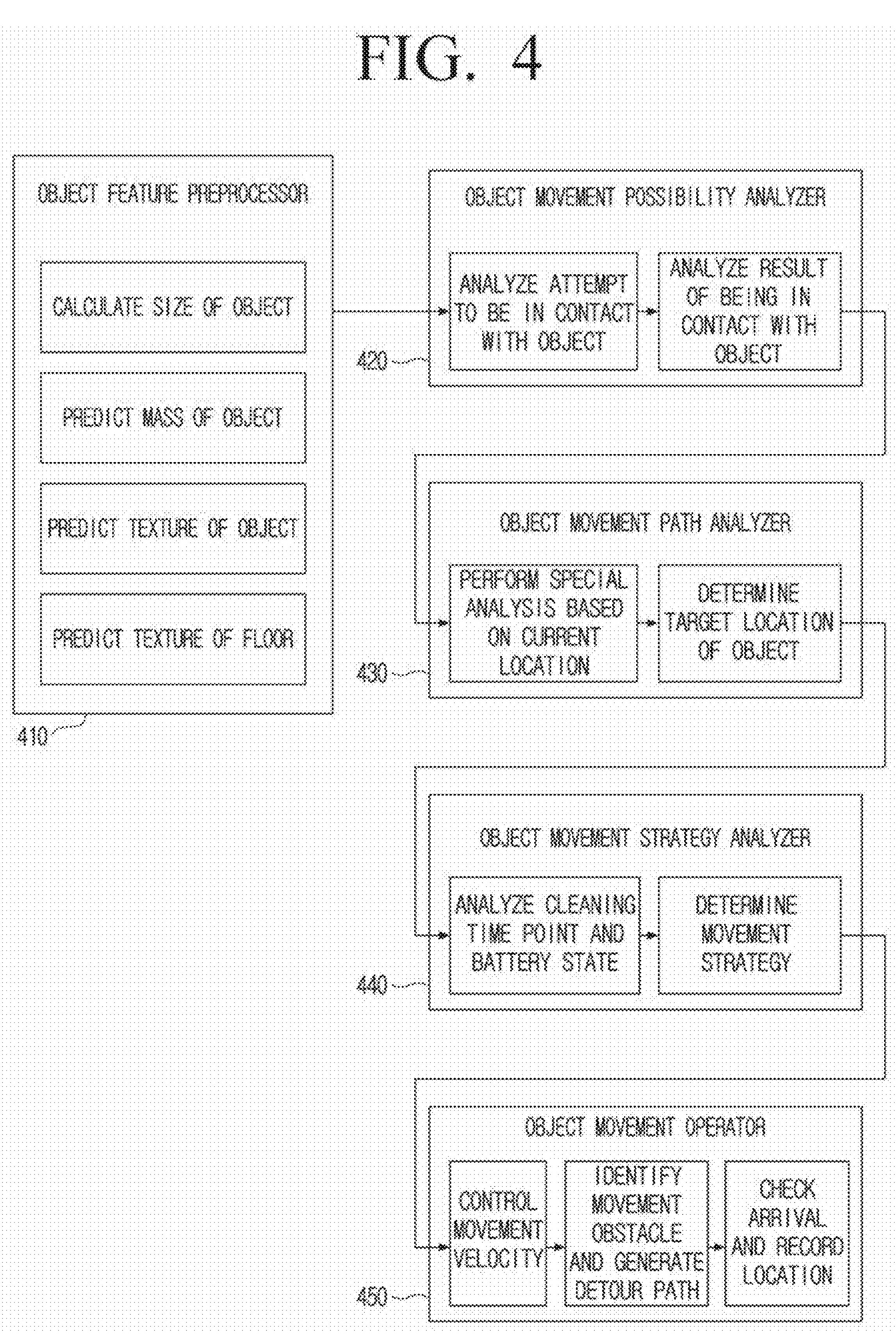
FIG. 4 is a diagram for explaining an operation of controlling travel of the robot cleaner according to an embodiment.

FIG. 4 is a diagram for explaining an operation of controlling the travel of the robot cleaner 100 according to an embodiment.

Referring to FIG. 4, the robot cleaner 100 may include at least one of an object feature preprocessor 410, an object movement possibility analyzer 420, an object movement path analyzer 430, an object movement strategy analyzer 440, or an object movement operator 450.

The object feature preprocessor 410 may acquire the feature information related to the object. The object feature preprocessor 410 may calculate (or identify) a size (or volume) of the object. The object feature preprocessor 410 may predict (or identify) a mass of the object. The object feature preprocessor 410 may predict (or identify) a texture of the object. The object feature preprocessor 410 may predict (or identify) a texture of the floor (or floor surface).

The object movement possibility analyzer 420 may determine the movement possibility of the object. The object movement possibility analyzer 420 may analyze the movement possibility of the object by using the feature information of the object. The object movement possibility analyzer 420 may come into contact with the object to thus apply the physical force to the object. The object movement possibility analyzer 420 may come into contact with the object to thus attempt to move the object. The object movement possibility analyzer 420 may analyze the movement possibility of the object based on a contact result (or attempt result).

The object movement path analyzer 430 may perform spatial analysis in a case where the object movement possibility analyzer 420 determines that the object may be moved. The object movement path analyzer 430 may identify information on the space where the robot cleaner 100 is currently located and a current location of the robot cleaner 100. The robot cleaner 100 may determine a final destination to which the object is to be moved.

The object movement strategy analyzer 440 may determine additional considerations in case of performing the operation to move the object. The object movement strategy analyzer 440 may determine a cleaning time point. The object movement strategy analyzer 440 may determine the movement path based on the cleaning time point. For example, the robot cleaner 100 may move the object to the temporary location without moving the object directly to the target location. The robot cleaner 100 may move the object in the temporary location to the target location by considering the cleaning time point. The object movement strategy analyzer 440 may determine the movement path by using the power information (or battery remaining amount information).

The object movement operator 450 may travel the movement path based on result information analyzed by the object movement strategy analyzer 440. The object movement operator 450 may control a movement velocity. The object movement operator 450 may identify an additional obstacle (or additional target object). The object movement operator 450 may travel by avoiding the additional obstacle. The object movement operator 450 may move the object to the target location and then record operation completion. The object movement operator 450 may store the movement path and a final location after the operation completion.

Figure 5:
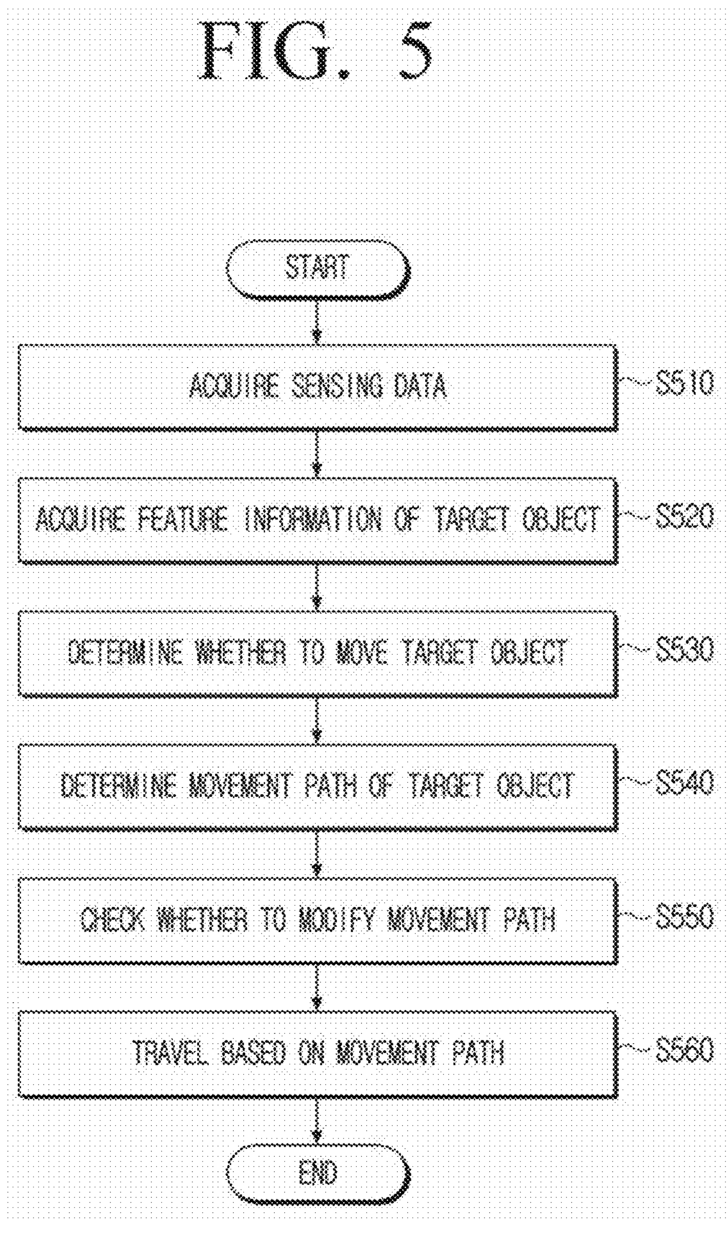
FIG. 5 is a flowchart for explaining a travel operation using feature information of the object according to an embodiment.

FIG. 5 is a flowchart for explaining a travel operation using the feature information of the object according to an embodiment.

Referring to FIG. 5, the robot cleaner 100 may acquire the sensing data (S510). The sensing data may be data acquired through the sensor included in the robot cleaner 100.

The robot cleaner 100 may acquire the feature information of the target object 10 based on the sensing data (S520). The robot cleaner 100 may identify the plurality of objects based on the sensing data. The robot cleaner 100 may select (or identify) the object which is an analysis target among the plurality of objects. The object which is the analysis target may be determined as the target object 10.

The robot cleaner 100 may acquire at least one feature information related to the target object 10 by analyzing the sensing data (S520). The feature information may include at least one of the size information, volume information, the mass information, or the texture information.

The robot cleaner 100 may determine whether to move the target object 10 (S530). The robot cleaner 100 may determine whether to move the target object 10 based on the feature information of the target object 10. The robot cleaner 100 may determine whether the target object 10 is an object that needs to be moved.

The robot cleaner 100 may determine the movement path of the target object 10 (S540) in case of identifying the target object 10 as the object that needs to be moved. The robot cleaner 100 may determine to which location the target object 10 is to be moved by the predetermined method. The final location to which the target object 10 is to be moved may be described as the target location.

The robot cleaner 100 may check whether to modify the movement path (S550). The robot cleaner 100 may determine whether to modify the movement path by considering additional information before moving the target object 10. The robot cleaner 100 may determine whether to modify the movement path by considering the additional information while moving the target object 10. The additional information may be the power information of the robot cleaner 100. A description thereof is described with reference to FIGS. 8, 13, and 14. The additional information may be the additional target object. A description thereof is described with reference to FIGS. 20 and 21.

The robot cleaner 100 may travel based on the movement path or the modified movement path (S560). The robot cleaner 100 may move the target object 10 to the target location based on the movement path or the modified movement path.

Figure 6:
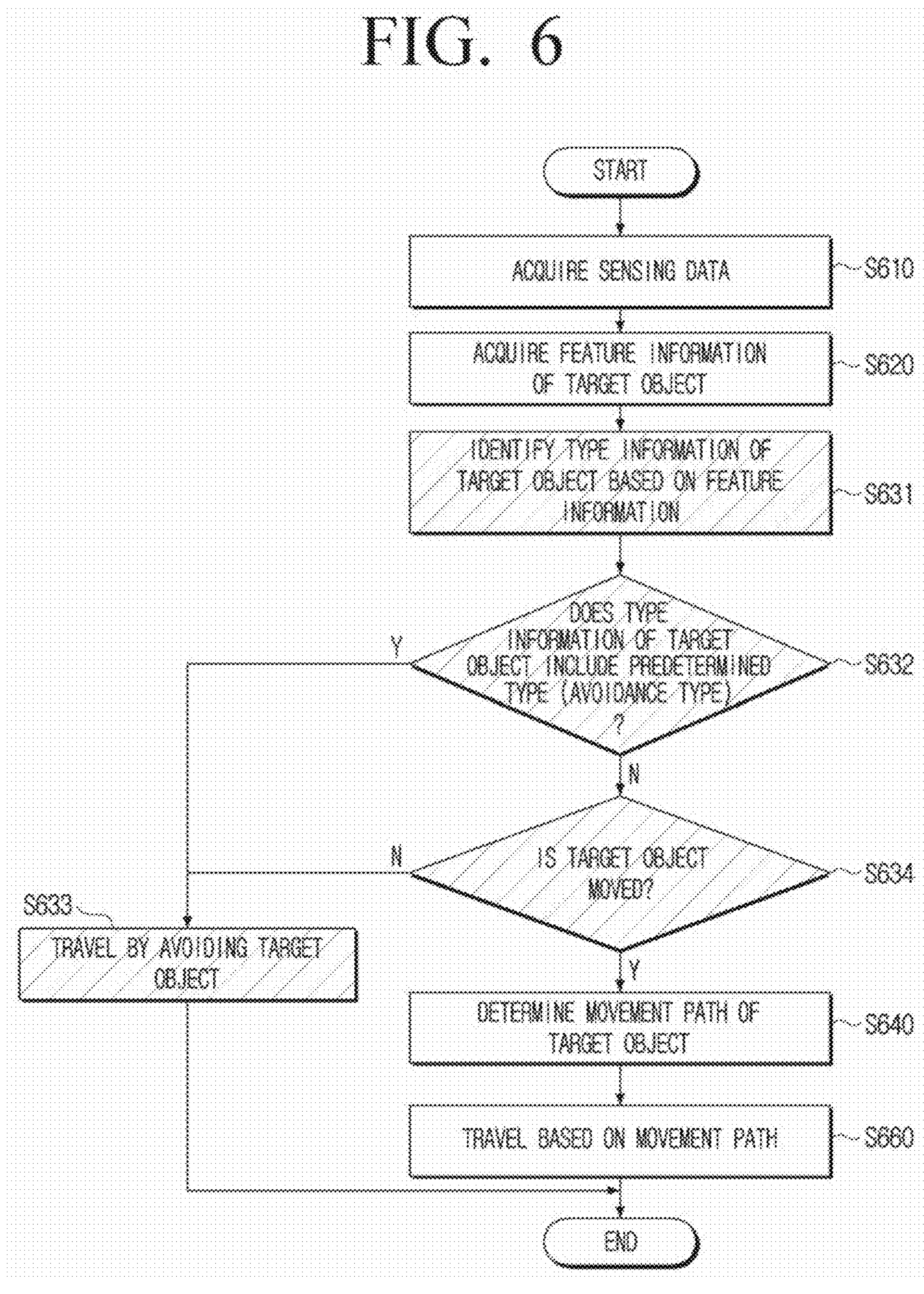
FIG. 6 is a flowchart for explaining an operation of determining whether to avoid the object according to an embodiment.

FIG. 6 is a flowchart for explaining an operation of determining whether to avoid the target object 10 according to an embodiment.

Operations S610, S620, S640, and S660 of FIG. 6 may correspond to operations S510, S520, S540, and S560 of FIG. 5.

After acquiring the feature information of the target object 10, the robot cleaner 100 may identify the type information of the target object 10 based on the feature information (S631). The type information may include the information where the object is classified into the predetermined category.

For example, the type information may include the movable type or the non-movable type. The type information of the wall object may be the non-movable type, and the toy object may be the movable type.

For example, the type information may include the fragile type and the non-fragile type. The object having the glass texture may be the fragile type, and the object having the plastic texture may be the non-fragile type.

The type information may include at least one type. The type information of the target object 10 may be the plurality of types.

The robot cleaner 100 may identify whether the type information of the target object 10 is included in the predetermined type (S632). The predetermined type may be described as the avoidance type. The predetermined type may include the type highly required to be avoided because the target object 10 itself is impossible to be moved.

The robot cleaner 100 may travel by avoiding the target object 10 (S633) in a case where the type information of the target object 10 includes the predetermined type (S632-Y). The robot cleaner 100 may determine to avoid the target object 10 based on the type information that includes the predetermined type.

The robot cleaner 100 may identify whether the target object 10 is moved (S634) in a case where the type information of the target object 10 does not include the predetermined type (S632-N). The robot cleaner 100 may apply the physical force to the target object 10 to thus move the target object 10. The robot cleaner 100 may be moved in contact with the target object 10. The robot cleaner 100 may attempt to be moved in contact with the target object 10. After coming into contact with the target object 10, the robot cleaner 100 may determine whether the target object 10 is moved.

The robot cleaner 100 may not be able to move the target object 10 in a case where the target object 10 is heavy.

The robot cleaner 100 may travel by avoiding the target object 10 (S633) in a case where the target object 10 is not moved (S634).

The robot cleaner 100 may determine the movement path of the target object 10 (S640) in a case where the target object 10 is moved (S634-Y). The robot cleaner 100 may travel based on the movement path (S650).

FIG. 7 is a flowchart for explaining an operation of determining whether to avoid the target object 10 according to an embodiment.

Operations S710, S720, S740, and S760 of FIG. 7 may correspond to the operations S510, S520, S540, and S560 of FIG. 5. Omitted are their redundant descriptions.

After acquiring the sensing data, The robot cleaner 100 may acquire at least one of the size information of the target object 10, the mass information of the target object 10, or the texture information of the target object 10 (S720).

The robot cleaner 100 may determine whether a height of the target object 10 is the threshold height or more (S731). The robot cleaner 100 may acquire the height of the target object 10 based on the size information of the target object 10. The robot cleaner 100 may check whether the height of the target object 10 is the threshold height or more.

The target object 10 may fall in a case where the target object 10 has a great height. The robot cleaner 100 may use the threshold height as a reference for a risk of its falling. A front view of the robot cleaner 100 may be narrow in a case where the target object 10 has the great height. The reason is that a viewing angle of the sensor may be disturbed by the target object 10. In a case where the sensing is difficult, the robot cleaner 100 may have a risk of hitting another object while moving the target object 10.

The robot cleaner 100 may travel by avoiding the target object 10 (S732) in a case where the height of the target object 10 is the threshold height or more (S731-Y).

The robot cleaner 100 may determine whether the texture information of the target object 10 includes a predetermined texture (S733) in a case where the height of the target object 10 is not the threshold height or more (S731-N). The predetermined texture may be a texture where damage to the object is expected due to the object movement. For example, the predetermined texture may include the glass texture.

The robot cleaner 100 may travel by avoiding the target object 10 (S732) in a case where the texture information of the target object 10 includes the predetermined texture (S733-Y).

The robot cleaner 100 may determine whether the mass information of the target object 10 is the threshold mass or more (S734) in a case where the texture information of the target object 10 does not include the predetermined texture (S733-N). It may be impossible for the robot cleaner 100 to move the target object 10 in a case where the target object has a heavy mass.

The robot cleaner 100 may travel by avoiding the target object 10 (S732) in a case where the mass information of the target object 10 is the threshold mass or more (S734-Y).

The robot cleaner 100 may perform the operations S740 and S760 in a case where the mass information of the target object 10 is not the threshold mass or more (S734-N).

FIG. 8 is a flowchart for explaining the travel operation using the power information according to an embodiment.

Referring to FIG. 8, the robot cleaner 100 may determine whether to move the target object 10 (S830). The robot cleaner 100 may acquire the power information of the robot cleaner 100 (S841) in case of determining to move the target object 10. The power information may include power remaining information for driving the robot cleaner 100. The power information may be described as the battery information, the remaining battery information, the remaining power information, or the like.

The robot cleaner 100 may determine which method to use to move the target object 10 based on the power information. The method of moving the target object 10 may be described as the movement type. The movement type may include at least one of a distributed movement type, a centralized movement type, or a linear movement type.

The robot cleaner 100 may identify whether the power information is a first threshold power value or more (S842).

The robot cleaner 100 may perform the operations S841 and S842 in a case where the power information is not the first threshold power value or more (S842-N). The robot cleaner 100 may need additional power to move the target object 10. The robot cleaner 100 may move the target object 10 only in a case where the power information is sufficient.

The robot cleaner 100 may identify whether the power information is a second threshold value or more (S843) in a case where the power information is the first threshold power value or more (S842-Y).

The robot cleaner 100 may determine the distributed movement type (S844) in a case where the power information is not the second threshold value or more (S843-N).

The robot cleaner 100 may identify whether the power information is a third threshold power value or more (S845) in a case where the power information is the second threshold value or more (S843-Y).

The robot cleaner 100 may determine the centralized movement type (S846) in a case where the power information is not the third threshold power value or more (S845-N).

The robot cleaner 100 may determine the linear movement type (S847) in a case where the power information is the third threshold power value or more (S845-Y).

The robot cleaner 100 may determine the movement path based on the determined movement type (S848).

The first threshold power value may be less than the second threshold power value, and the second threshold power value may be less than the third threshold power value.

Figure 9:
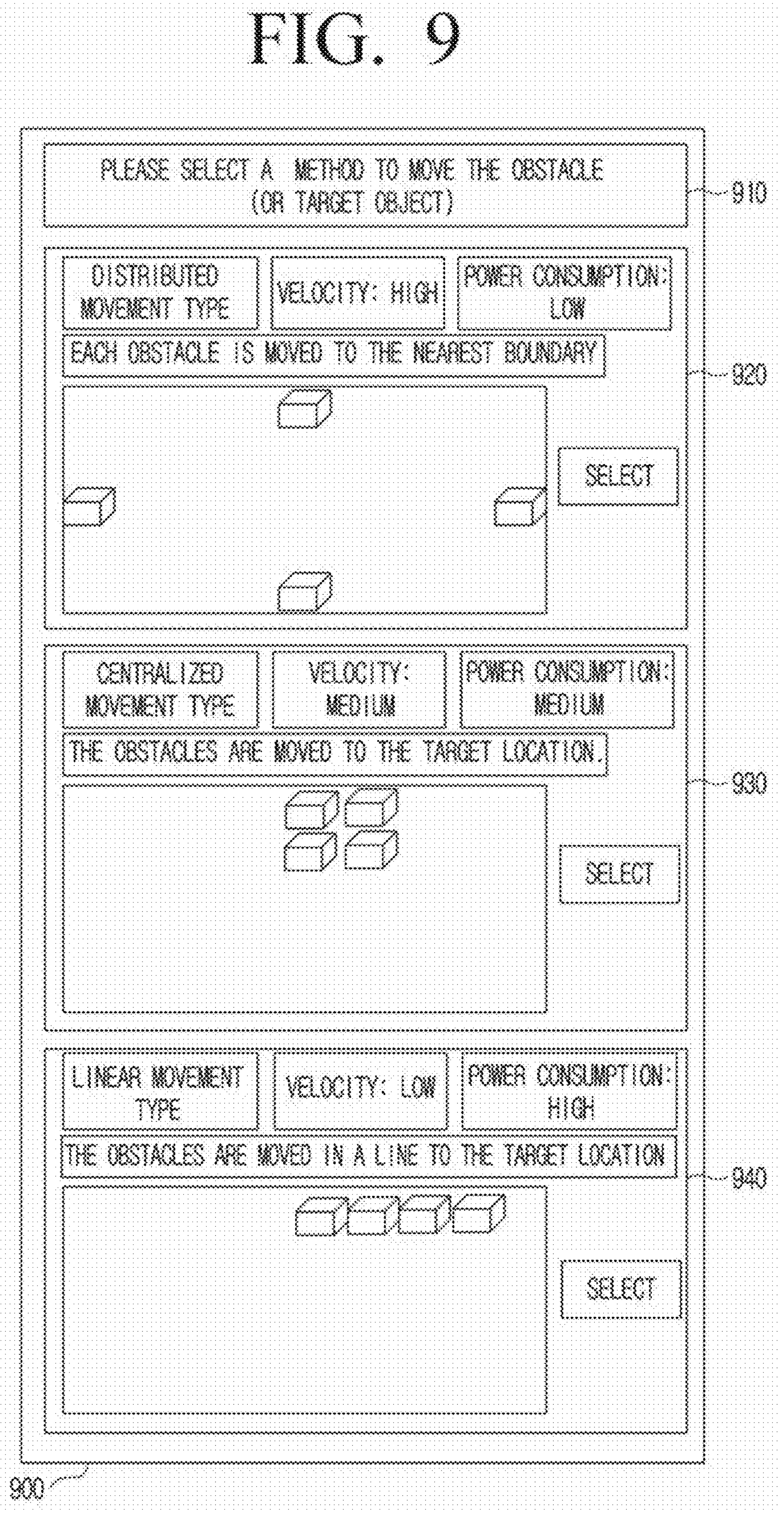
FIG. 9 is a diagram for explaining an operation of determining a movement type according to an embodiment.

FIG. 9 is a diagram for explaining an operation of determining the movement type according to an embodiment.

Referring to FIG. 9, the robot cleaner 100 may predetermine the movement type. A guide screen 900 for setting the movement type may be provided to the user to predetermine the movement type.

The guide screen may be provided through a display of the robot cleaner 100 or a user terminal device.

For example, the robot cleaner 100 may provide the guide screen 900. The robot cleaner 100 may receive a user input for selecting the movement type through the guide screen 900.

For example, the user terminal device may provide the guide screen 900. The user terminal device may receive the guide screen 900 through the robot cleaner 100, an access point (AP) device connected to the robot cleaner 100, or a server connected to the robot cleaner 100. The user terminal device may receive the user input corresponding to various settings related to the robot cleaner 100. The user terminal device may transmit the user input to the robot cleaner 100. The robot cleaner 100 may apply the movement type as a predetermined movement type based on the received user input.

The guide screen 900 may include at least one of a description region 910, a region 920 corresponding to the distributed movement type, a region 930 corresponding to the centralized movement type, or a region 940 corresponding to the linear movement type.

The description region 910 may include text information for guiding the determination of the movement type.

The region 920 corresponding to the distributed movement type may include at least one of information indicating a velocity of the distributed movement type (e.g., velocity: high), information indicating a power consumption level of the distributed movement type (e.g., power consumption: low), information describing the distributed movement type (e.g., each obstacle is moved to the nearest boundary), or an image for illustrating the distributed movement type.

The region 930 corresponding to the centralized movement type may include at least one of information indicating a velocity of the centralized movement type (e.g., velocity: medium), information indicating a power consumption level of the centralized movement type (e.g., power consumption: medium), information describing the centralized movement type (e.g., the obstacles are moved to the target location), or an image for illustrating the centralized movement type.

The region 940 corresponding to the linear movement type may include at least one of information indicating a velocity of the linear movement type (e.g., velocity: low), information indicating a power consumption level of the linear movement type (e.g., power consumption: high), information describing the linear movement type (e.g., the obstacles are moved in a line to the target location), or an image for illustrating the linear movement type.

Figure 10:
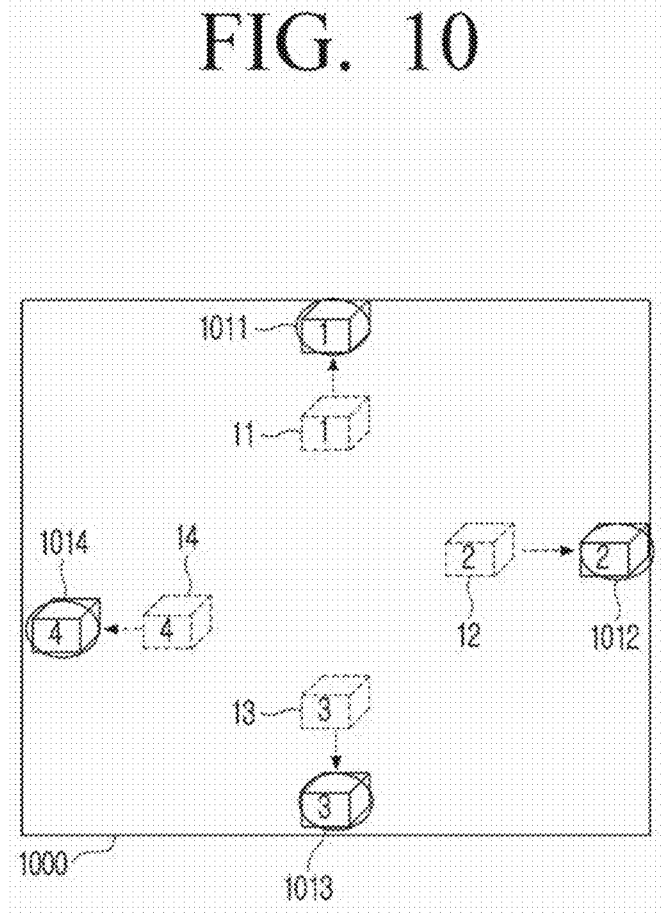
FIG. 10 is a diagram for explaining a distributed movement type according to an embodiment.

FIG. 10 is a diagram for explaining the distributed movement type according to an embodiment.

Referring to embodiment 1000 of FIG. 10, the robot cleaner 100 may move the target object 10 based on the distributed movement type.

The robot cleaner 100 may determine a location nearest to the target object 10 among the boundary lines as the target location (or final location or goal location) based on the distributed movement type.

The robot cleaner 100 may perform the spatial analysis. The robot cleaner 100 may identify the boundary line or a boundary region by analyzing the space where the robot cleaner 100 is located. The robot cleaner 100 may determine the nearest location among the boundary lines as the target location. The boundary line may be described as an edge. The boundary region may be described as an edge region. The boundary region may include the boundary line.

The robot cleaner 100 may acquire location information of the plurality of boundary regions and location information of the robot cleaner 100. The robot cleaner 100 may acquire a difference value between the location information of each of the plurality of boundary regions and the location information of the target object. The robot cleaner 100 may determine the final location based on the boundary region corresponding to the smallest value among the difference values.

For example, assume that there are four boundary lines or four boundary regions in the space where the robot cleaner 100 is located. The robot cleaner 100 may identify the nearest boundary region among the four boundary regions. The robot cleaner 100 may acquire the plurality of boundary regions and the current location of the target object. The robot cleaner 100 may calculate a difference between each of the four boundary regions and the current location of the target object. The robot cleaner 100 may determine the target location based on the boundary region corresponding to the smallest difference value among four calculation results (the difference values).

The plurality of target objects may exist. The robot cleaner 100 may identify a plurality of target objects 11, 12, 13, and 14. The robot cleaner 100 may move the plurality of target objects based on the distributed movement type.

The robot cleaner 100 may move each target object based on the nearest boundary line.

The robot cleaner 100 may determine a final location 1011 corresponding to the first target object 11 based on the location information and spatial information of the first target object 11.

The robot cleaner 100 may determine a final location 1012 corresponding to the second target object 12 based on the location information and spatial information of the second target object 12.

The robot cleaner 100 may determine a final location 1013 corresponding to the third target object 13 based on the location information and spatial information of the third target object 13.

The robot cleaner 100 may determine a final location 1014 corresponding to the fourth target object 14 based on the location information and spatial information of the fourth target object 14.

Figure 11:
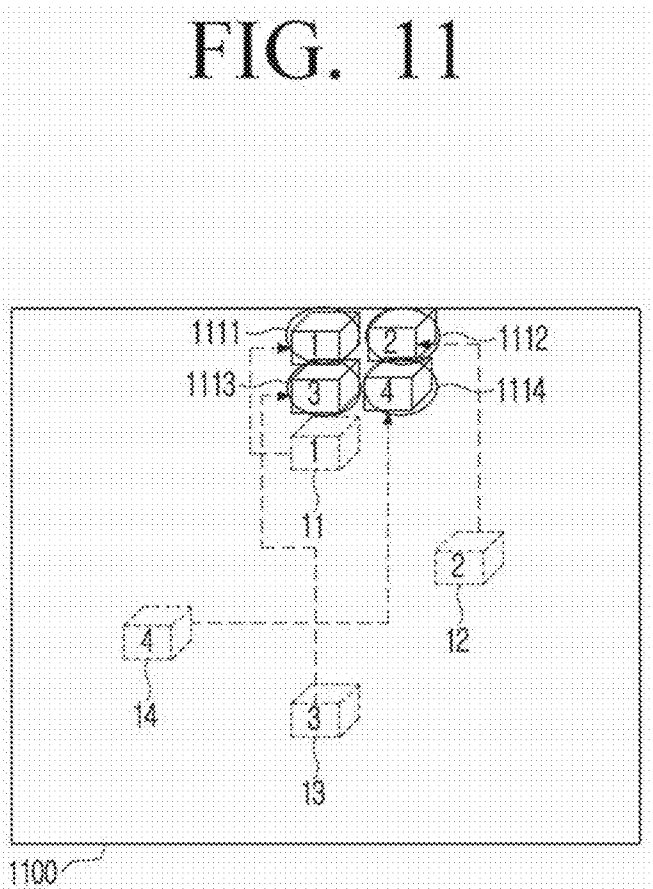
FIG. 11 is a diagram for explaining a centralized movement type according to an embodiment.

FIG. 11 is a diagram for explaining the centralized movement type according to an embodiment.

Referring to embodiment 1100 of FIG. 11, the robot cleaner 100 may move the target object 10 based on the centralized movement type. The centralized movement type may be a type for moving the plurality of target objects to the predetermined location.

Assume that the target object 10 includes the first target object 11, the second target object 12, the third target object 13, and the fourth target object 14.

The robot cleaner 100 may move the first target object 11 to a predetermined location 1111.

For example, the predetermined location 1111 may be a location determined based on the nearest boundary line from the first target object 11. The robot cleaner 100 may determine the nearest location as the predetermined location 1111 based on a current location of the first target object 11 and the plurality of boundary lines included in the space where the robot cleaner 100 is located. A similar operation is described with reference to FIG. 10. Omitted is its redundant description.

For example, the predetermined location 1111 may be a location predetermined by the user. The robot cleaner 100 may pre-store the predetermined location 1111 before the travel.

After moving the first target object 11 to the predetermined location 1111, the robot cleaner 100 may further identify the second target object 12. The robot cleaner 100 may determine a location 1112 corresponding to the second target object 12 based on the predetermined location 1111. The location 1112 may be a location within a threshold distance from the predetermined location 1111. The robot cleaner 100 may move the second target object 12 to the location 1112 because the first target object 11 exists at the predetermined location 1111.

After moving the second target object 12 to the location 1112, the robot cleaner 100 may further identify the third target object 13. The robot cleaner 100 may determine a location 1113 corresponding to the third target object 13 based on the location 1112. The location 1113 may be a location within the threshold distance from the location 1112. The robot cleaner 100 may move the third target object 13 to the location 1113 because the second target object 12 exists at the predetermined location 1112.

After moving the third target object 13 to the location 1113, the robot cleaner 100 may further identify the fourth target object 14. The robot cleaner 100 may determine a location 1114 corresponding to the fourth target object 14 based on the location 1113. The location 1114 may be a location within the threshold distance from the location 1113. The robot cleaner 100 may move the fourth target object 14 to the location 1114 because the third target object 13 exists at the predetermined location 1113.

Figure 12:
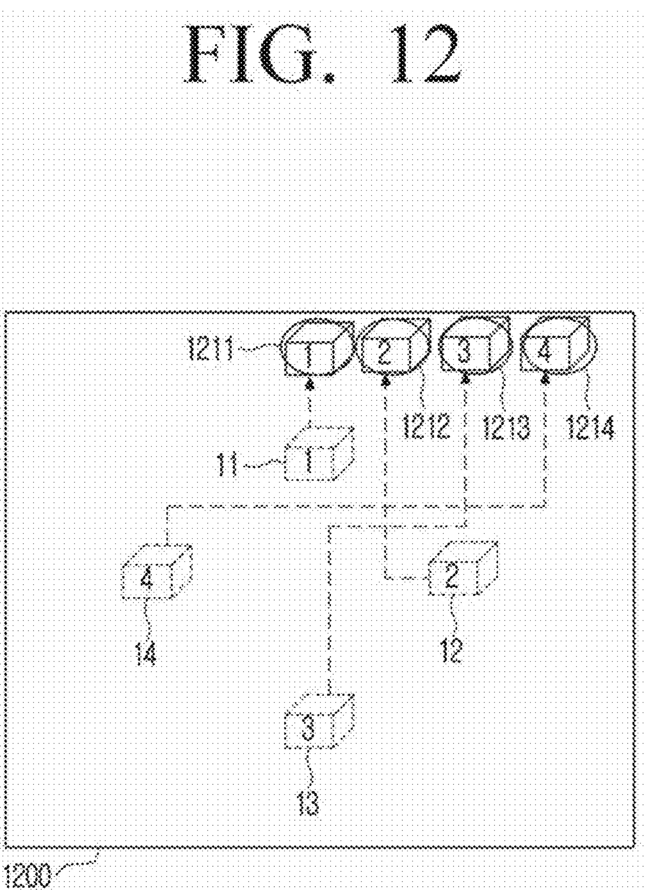
FIG. 12 is a diagram for explaining a linear movement type according to an embodiment.

FIG. 12 is a diagram for explaining the linear type according to an embodiment.

Referring to FIG. 12, the robot cleaner 100 may move the target object 10 based on the linear movement type. The linear movement type may be a type for moving the plurality of target objects in a line to the predetermined location.

The predetermined location 1211, location 1212, location 1213, and location 1214 of FIG. 12 may correspond to the predetermined location 1111, location 1112, location 1113, and location 1114 of FIG. 11. Omitted are their redundant descriptions.

Unlike the description of (embodiment 1100 of) FIG. 11, in embodiment 1200 of FIG. 12, a linear arrangement form may be maintained in case of determining the location 1212, the location 1213, and the location 1214. The robot cleaner 100 may move the plurality of target objects 11, 12, 13, and 14 to maintain the linear arrangement form.

Figure 13:
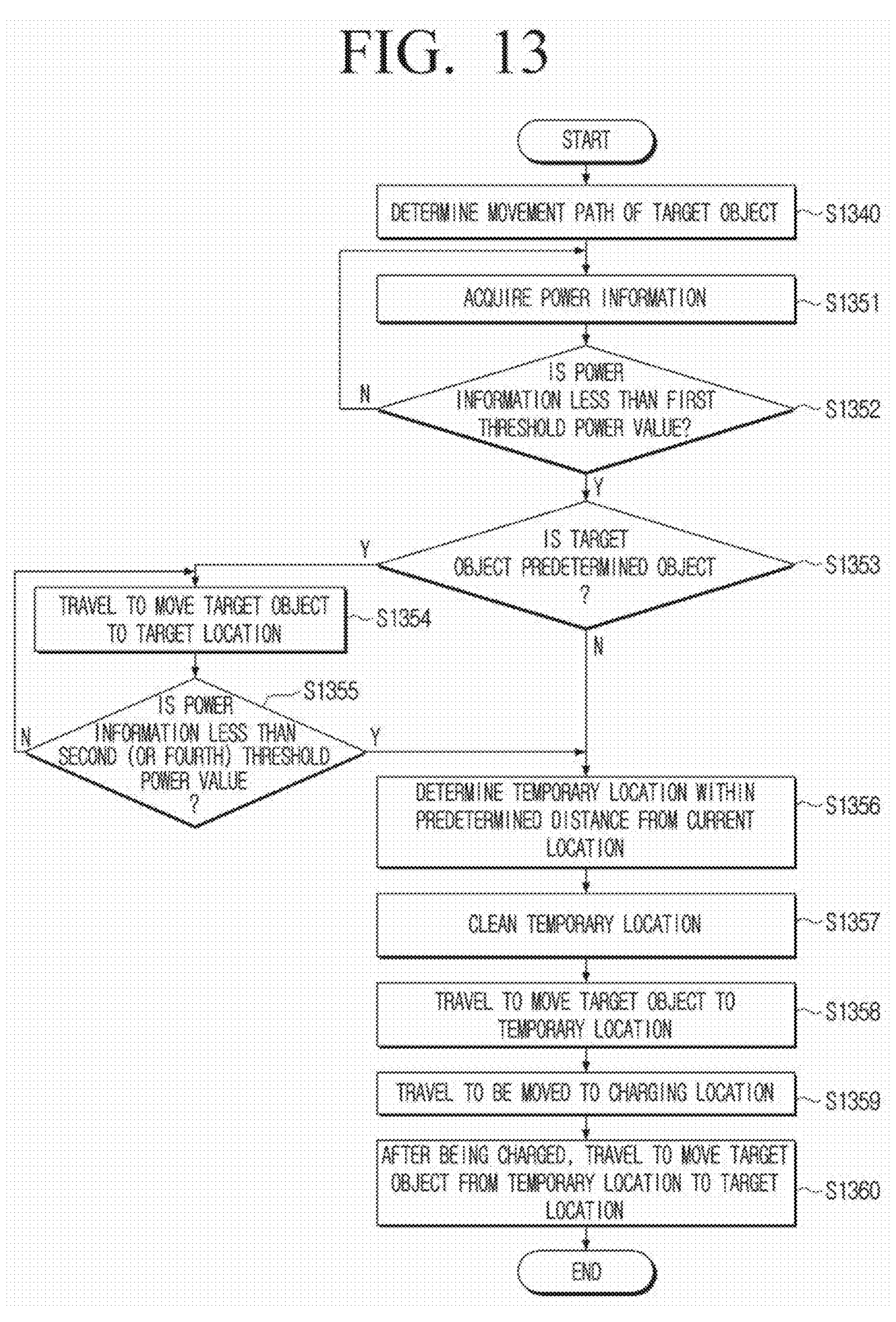
FIG. 13 is a flowchart for explaining a travel operation using power information according to an embodiment.

FIG. 13 is a flowchart for explaining the travel operation using the power information according to an embodiment.

Referring to FIG. 13, the robot cleaner 100 may determine the movement path of the target object (S1340). Operation S1340 may correspond to the operation S540 of FIG. 5. Omitted is its redundant description.

After determining the movement path of the target object 10, the robot cleaner 100 may acquire the power information (S1351). The power information may include the power remaining information for driving the robot cleaner 100. The power information may be described as the battery information, the remaining battery information, the remaining power information, or the like.

The robot cleaner 100 may determine whether the power information is less than the first threshold power value (S1352).

The robot cleaner 100 may perform the operations S1351 and S1352 in a case where the power information is not less than the first threshold power value (S1352-N). The first threshold power value may be the same as the first threshold power value of FIG. 8. The first threshold power value may be used as a reference to determine battery shortage. The power information less than the first threshold power value may be determined the battery shortage. The robot cleaner 100 needs to perform the charging operation.

The robot cleaner 100 may determine whether the target object 10 is the predetermined object (S1353) in a case where the power information is less than the first threshold power value (S1352-Y). The predetermined object may be an object requiring the movement prior to the charging. The predetermined object may be an object determined to be high risk. The predetermined object may be an object classified as a risk type.

For example, in a home with children, it may be determined that a dangerous tool object (e.g., driver or awl) needs to be moved before the charging. The predetermined object may include the tool object.

The robot cleaner 100 may travel to move the target object 10 to the target location (S1354) in a case where the target object 10 is the predetermined object (S1353-Y).

While traveling, the robot cleaner 100 may identify whether the power information is less than a second threshold power value (S1355). This second threshold power value may be different from the second threshold power value of FIG. 8. For classification, the second threshold power value of FIG. 13 may be described as a fourth threshold power value.

The second threshold power value may be less than the first threshold power value.

The robot cleaner 100 may perform the operations S1354 and S1355 in a case where the power information is not less than the second threshold power value (S1355-N).

The robot cleaner 100 may determine the temporary location within a predetermined distance from the current location (S1356) in a case where the power information is less than the second threshold power value (S1355-Y). The temporary location may be a location where the target object 10 is temporarily moved for the charging.

The robot cleaner 100 may determine the temporary location within the predetermined distance from the current location (S1356) in a case where the target object 10 is not the predetermined object (S1353-N).

The robot cleaner 100 may clean the temporary location (S1357). The robot cleaner 100 may first clean the temporary location before moving the target object 10.

The robot cleaner 100 may travel to move the target object 10 to the temporary location (S1358) in case of completely cleaning the temporary location.

After moving the target object 10 to the temporary location, the robot cleaner 100 may travel to be moved to the charging location (S1359). The charging location may be a location where a charging device is located.

After being completely charged, the robot cleaner 100 may travel to move the target object 10 from the temporary location to the target location (S1360). The robot cleaner 100 may be moved to the temporary location. The robot cleaner 100 may move the target object 10 from the temporary location to the target location.

Figure 14:
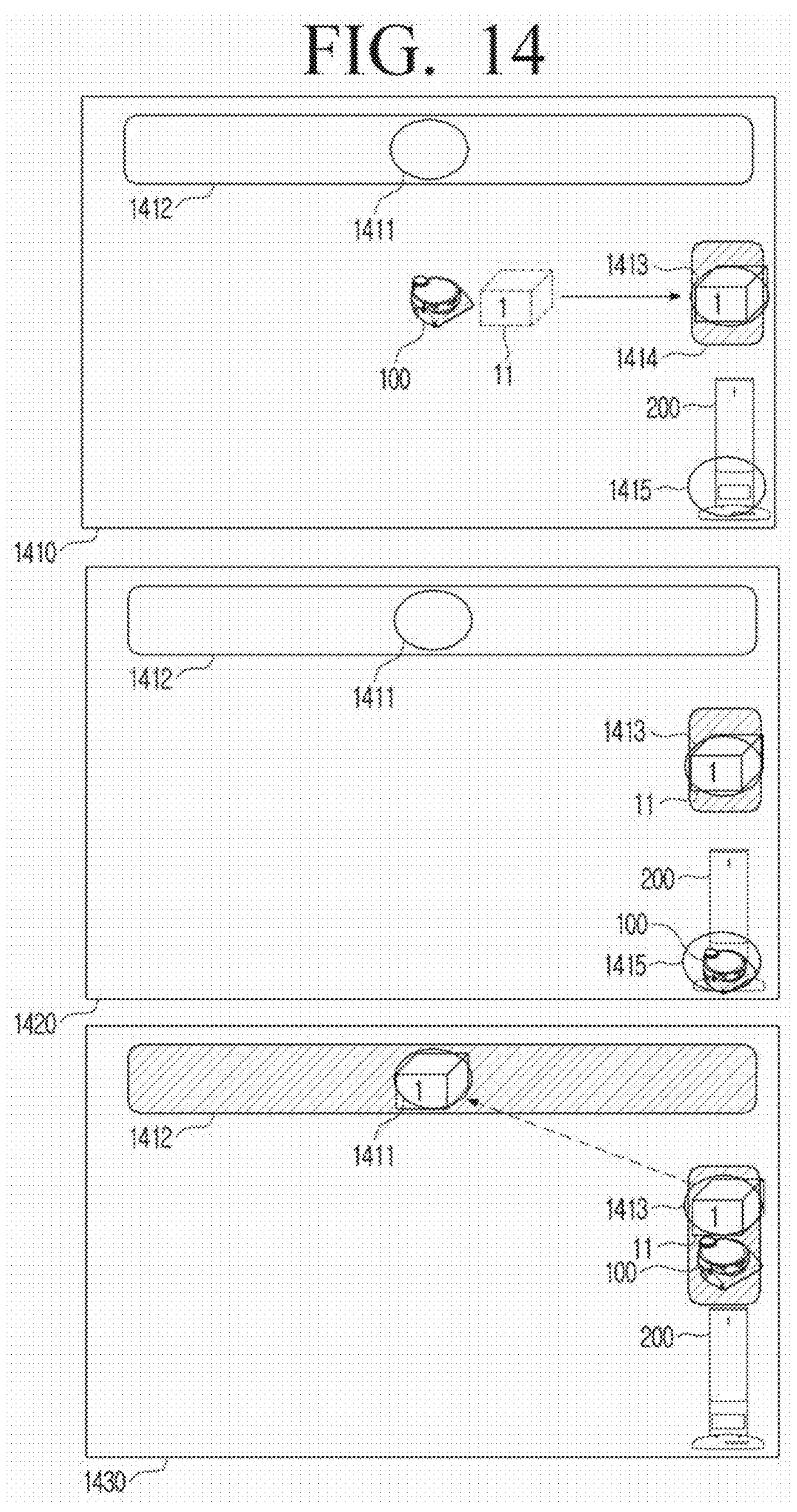
FIG. 14 is a diagram for explaining a charging operation during the travel according to an embodiment.

FIG. 14 is a diagram for explaining a charging operation during the traveling according to an embodiment.

Referring to embodiment 1410 of FIG. 14, the robot cleaner 100 may travel to move the first target object 11 to a target location 1411. The robot cleaner 100 may travel to first clean a region 1412 corresponding to the target location 1411. The robot cleaner 100 may determine to clean the region 1412 before moving the first target object 11 to the target location 1411. The robot cleaner 100 may perform an operation corresponding to the determination.

While traveling, the robot cleaner 100 may perform the charging operation. Before being moved to a charging device 200, the robot cleaner 100 may move the first target object 11 to a temporary location 1413. The temporary location 1413 may be the location nearest to the boundary line from the current location of the robot cleaner 100 (or the current location of the first target object 11). Before moving the first target object 11 to the temporary location 1413, the robot cleaner 100 may clean a region 1414 corresponding to the temporary location 1413. The robot cleaner 100 may move the first target object 11 to the temporary location 1413 in case of completely cleaning the region 1414.

According to embodiment 1420 of FIG. 14, after moving the first target object 11 to the temporary location 1413, the robot cleaner 100 may be moved to a charging location 1415 corresponding to the charging device 200.

According to embodiment 1430 of FIG. 14, after completely charged, the robot cleaner 100 may move the first target object 11 from the temporary location 1413 to the target location 1411. The robot cleaner 100 may determine to clean the region 1412 before moving the first target object 11 to the target location 1411.

Figure 15:
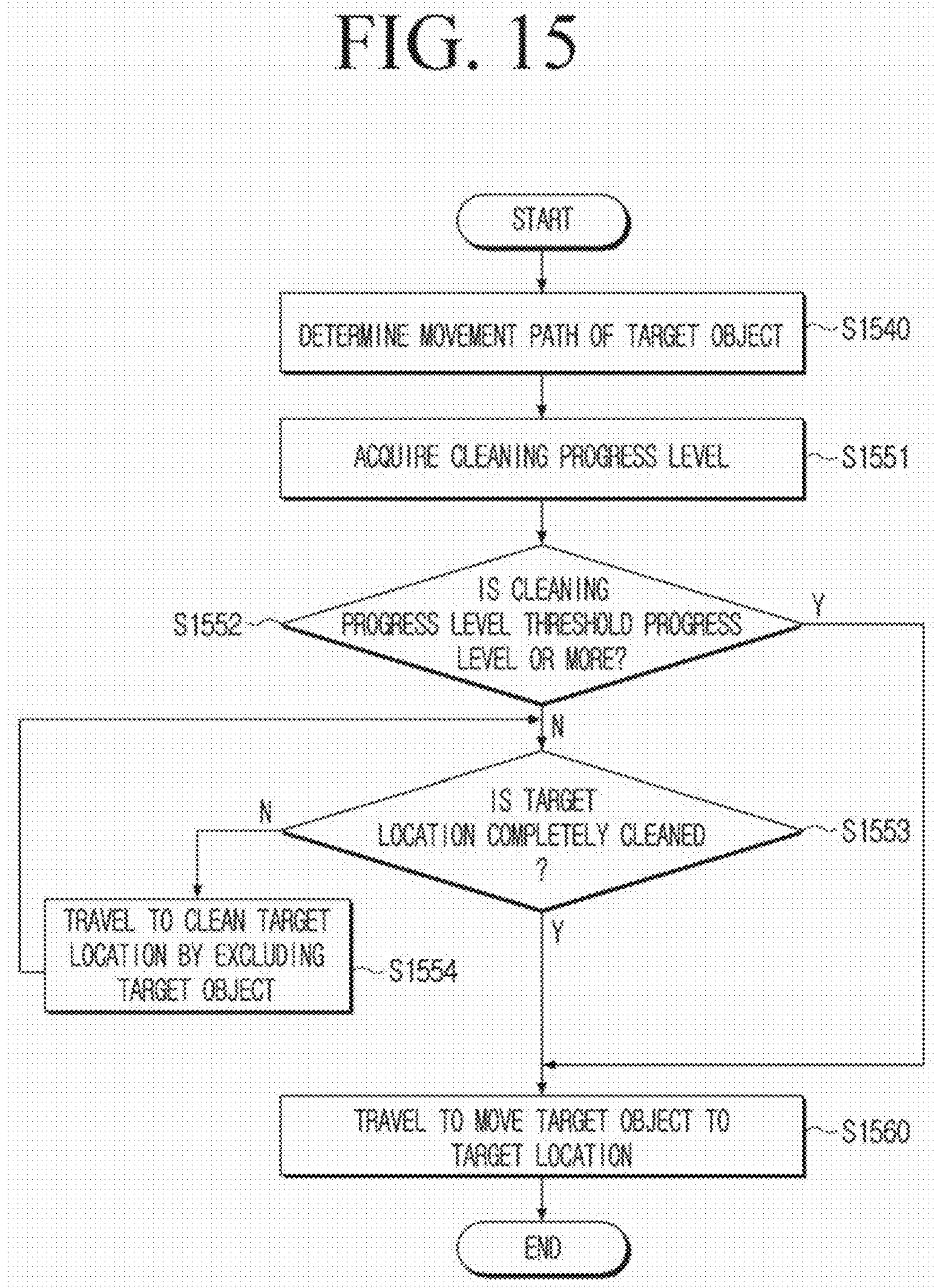
FIG. 15 is a flowchart for explaining an operation of first cleaning a target location according to an embodiment.

FIG. 15 is a flowchart for explaining an operation of first cleaning the target location according to an embodiment.

Referring to FIG. 15, the robot cleaner 100 may determine the movement path of the target object 10 (S1540). After determining the movement path, the robot cleaner 100 may acquire a cleaning progress level (S1551). The robot cleaner 100 may acquire the cleaning progress level in real time while traveling. The robot cleaner 100 may identify the target object 10, determine the movement path of the target object 10, and then determine whether to clean the target location by considering the cleaning progress level.

The robot cleaner 100 may determine whether the cleaning progress level is a threshold progress level or more (S1552). The robot cleaner 100 may clean the target location in advance in a case where a cleaning progress is determined as an initial step. It may be difficult for the robot cleaner 100 to clean the target location in a case where the target object 10 is moved to the target location. The robot cleaner 100 needs to clean the target location in advance.

The robot cleaner 100 may identify whether the target location is completely cleaned (S1553) in a case where the cleaning progress level is not the threshold progress level or more (S1552-N). The target location may be completely cleaned before the robot cleaner 100 discovers the target object 10.

The robot cleaner 100 may travel to first clean the target location by excluding the target object 10 (S1554) in a case where the target location is not completely cleaned (S1353). The target object 10 may be located at the current location or moved to the temporary location. The robot cleaner 100 may then perform the operation S1553.

The robot cleaner 100 may travel to move the target object 10 to the target location (S1560) in case of completely cleaning the target location (S1553-Y).

The robot cleaner 100 may travel to move the target object 10 to the target location (S1560) in a case where the cleaning progress level is the threshold progress level or more (S1552).

Figure 16:
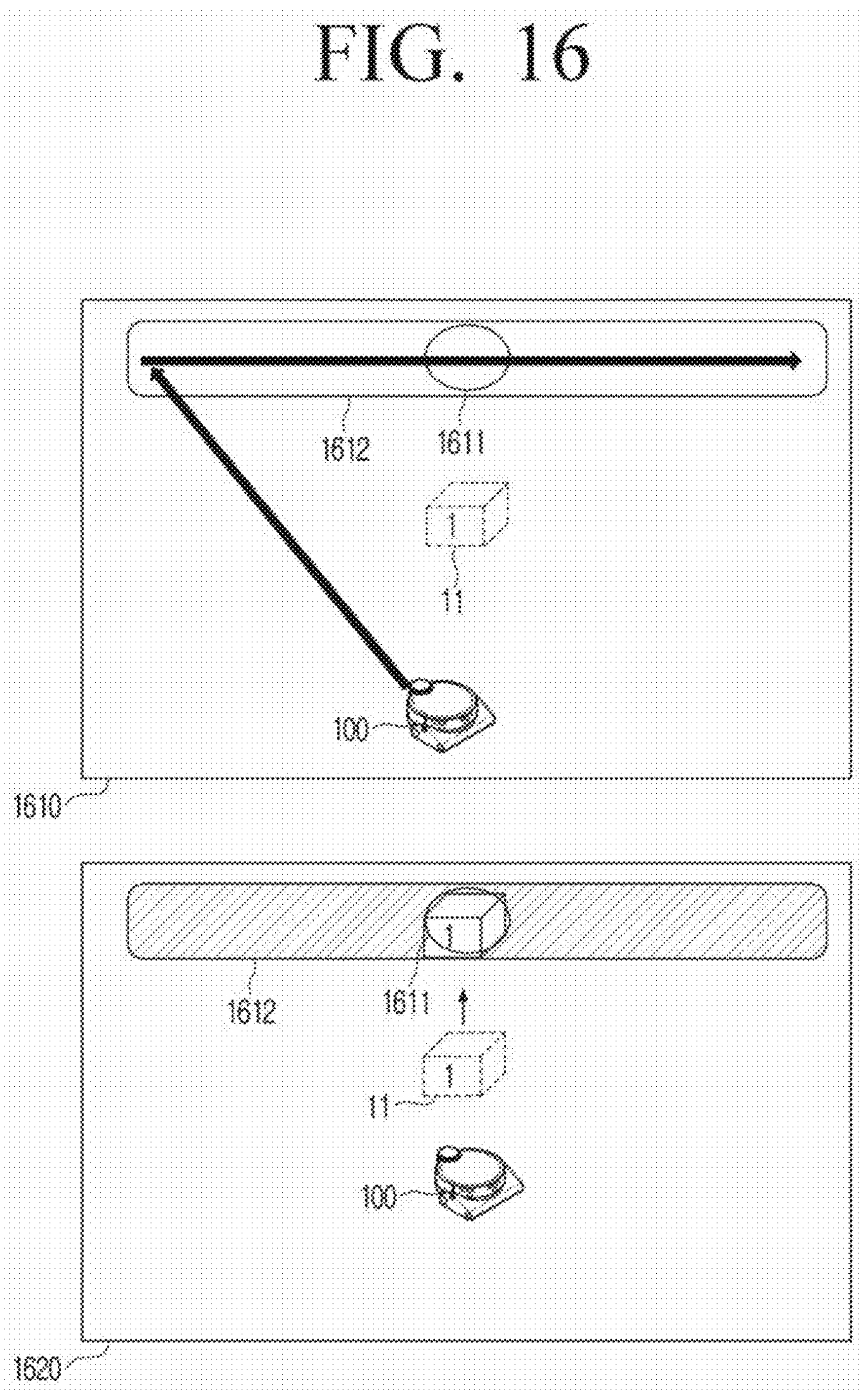
FIG. 16 is a diagram for explaining an operation of first cleaning a target location according to an embodiment.

FIG. 16 is a diagram for explaining an operation of first cleaning the target location according to an embodiment.

Referring to embodiment 1610 of FIG. 16, the robot cleaner 100 may determine to move the first target object 11 to a target location 1611. The robot cleaner 100 may travel to first clean a region 1612 corresponding to the target location 1611. While cleaning the region 1612, the robot cleaner 100 may not move the first target object 11. The robot cleaner 100 may clean the region 1612 without the target object 10.

Referring to embodiment 1620 of FIG. 16, after cleaning the region 1612, the robot cleaner 100 may move the first target object 11 to the target location 1611.

Figure 17:
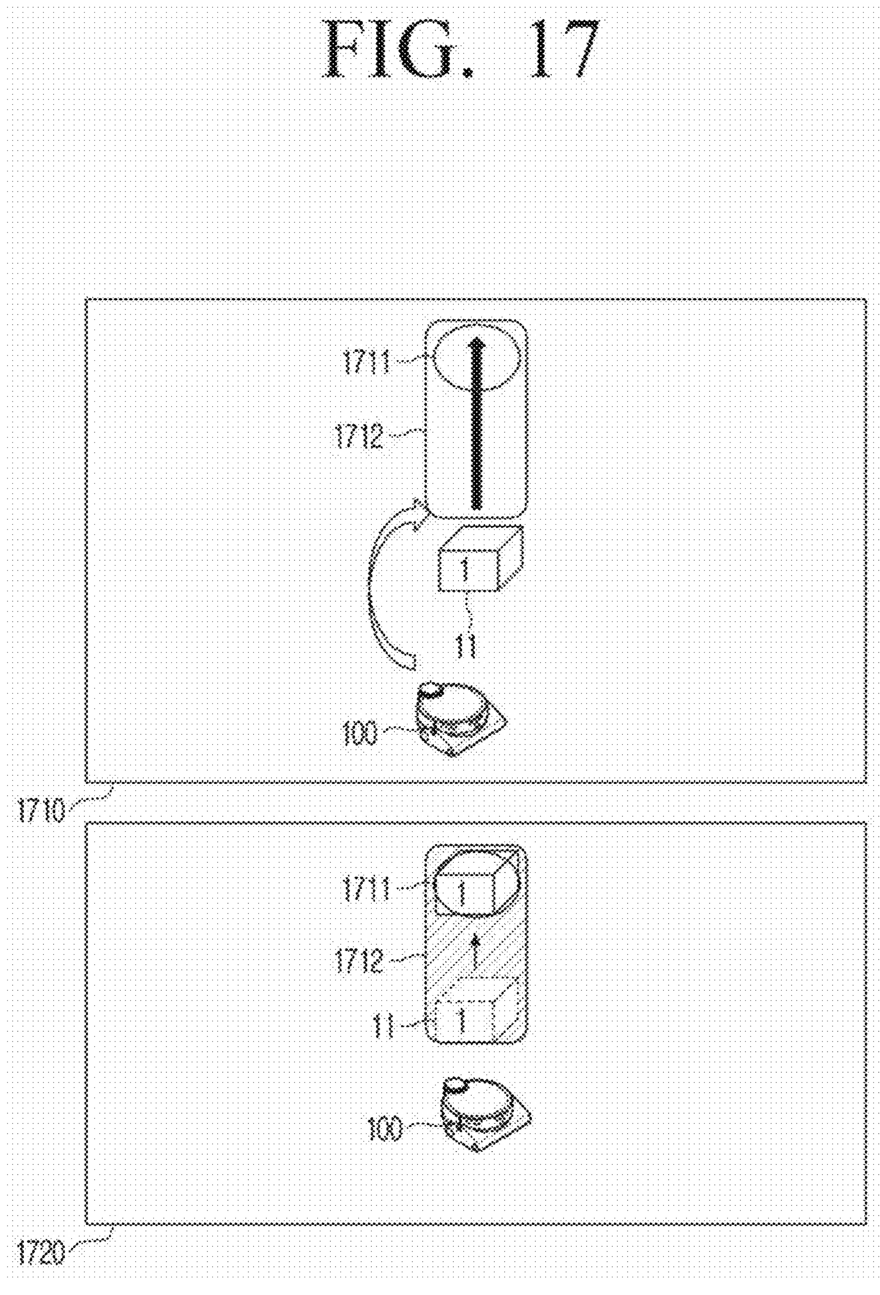
FIG. 17 is a diagram for explaining an operation of first cleaning a movement path according to an embodiment.

FIG. 17 is a diagram for explaining an operation of first cleaning the movement path according to an embodiment.

Referring to embodiment 1710 of FIG. 17, the robot cleaner 100 may determine to move the first target object 11 to a target location 1711. The robot cleaner 100 may determine to first clean a movement path 1712 corresponding to the target location 1711. Dust on the movement path may be dragged while the first target object 11 is moved. The robot cleaner 100 may remove dust existing on the movement path 1712 by first cleaning the movement path 1712. The movement path 1712 may be described as a region corresponding to the movement path.

Referring to embodiment 1720 of FIG. 17, after completely cleaning the movement path 1712, the robot cleaner 100 may move the first target object 11 to the target location 1711.

Figure 18:
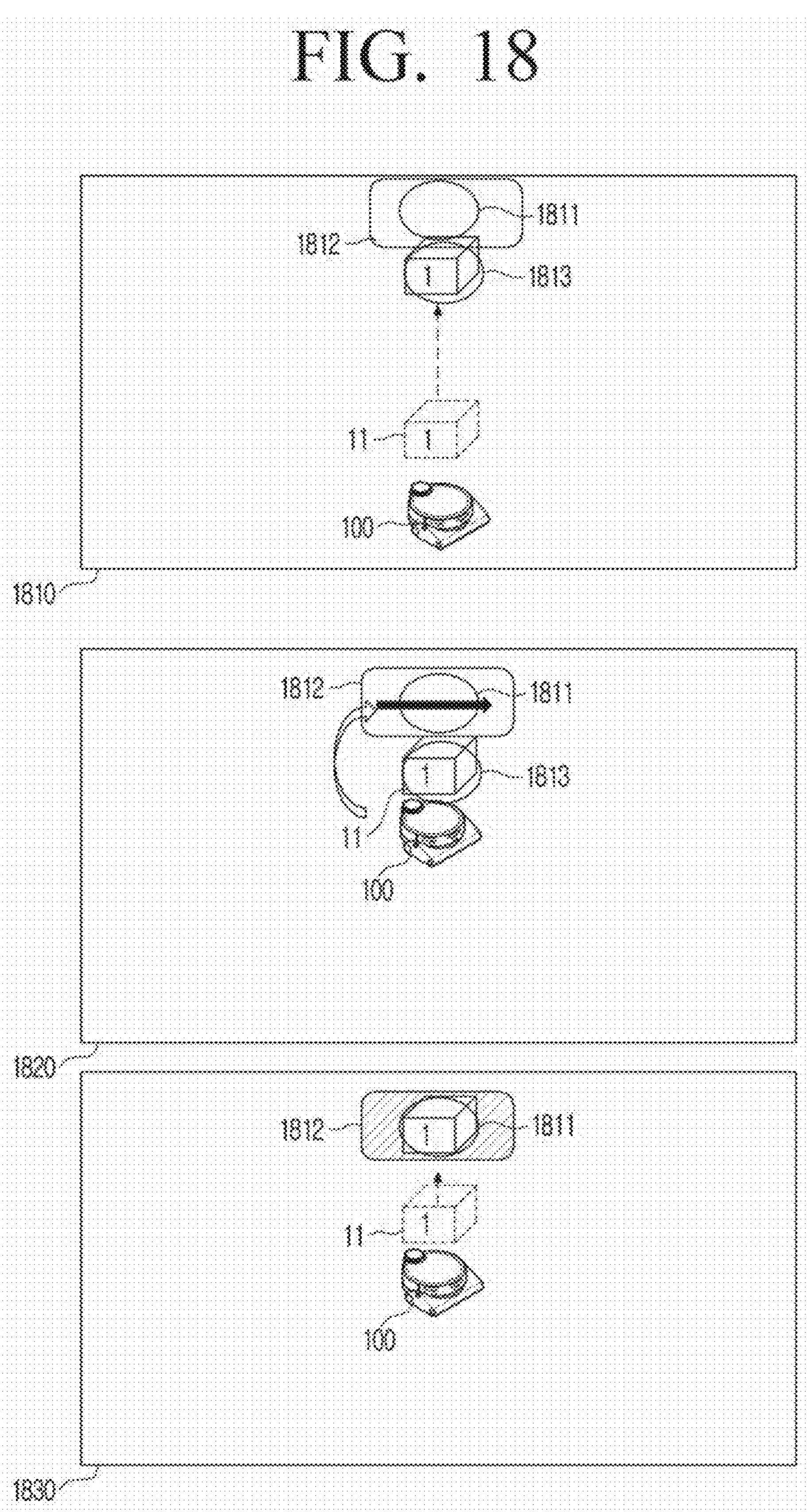
FIG. 18 is a diagram for explaining an operation of first cleaning a target location according to an embodiment.

FIG. 18 is a diagram for explaining an operation of first cleaning the target location according to an embodiment.

Referring to embodiment 1810 of FIG. 18, the robot cleaner 100 may determine to move the first target object 11 to a target location 1811. The robot cleaner 100 may determine to first clean a region 1812 corresponding to the target location 1811. The robot cleaner 100 may identify a temporary location 1813 within the threshold distance from the target location 1811. The robot cleaner 100 may move the first target object 11 to the temporary location 1813. The temporary location 1813 may be a location where the first target object 11 is temporarily disposed to first clean the region 1812.

Referring to embodiment 1820 of FIG. 18, after moving the first target object 11 to the temporary location 1813, the robot cleaner 100 may clean the region 1812.

Referring to embodiment 1830 of FIG. 18, after completely cleaning the region 1812, the robot cleaner 100 may move the first target object 11 to the target location 1811.

Figure 19:
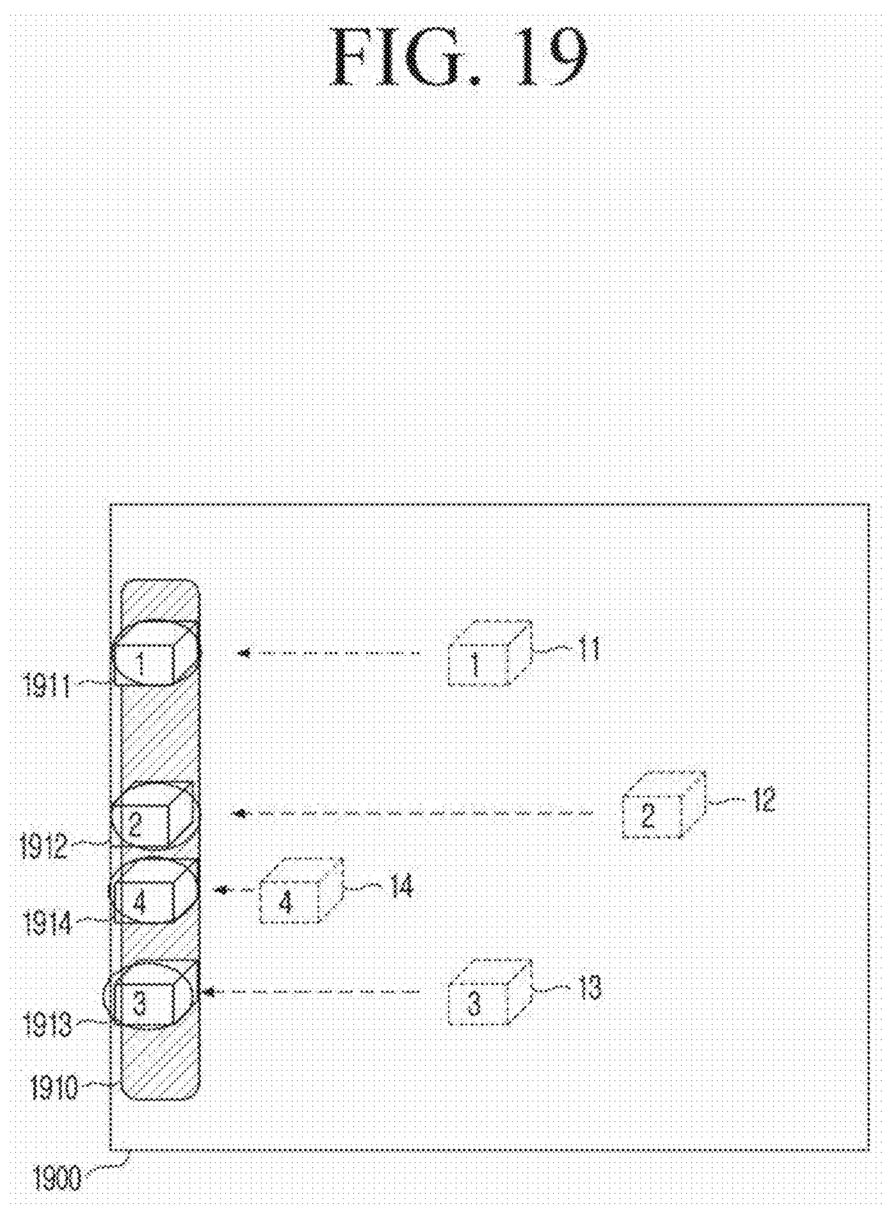
FIG. 19 is a diagram for explaining an operation of determining the target location according to an embodiment.

FIG. 19 is a diagram for explaining an operation of determining the target location according to an embodiment.

Referring to embodiment 1910 of FIG. 19, the robot cleaner 100 may consider a region completely cleaned already in case of determining the target location. The robot cleaner 100 may determine the target location based on the region completely cleaned already. The robot cleaner 100 may determine a region 1910 near to the boundary line among the region completely cleaned already. The robot cleaner 100 may further consider the locations of the target objects 11, 12, 13, and 14. The robot cleaner 100 may determine the region 1910 by considering a region adjacent to the target object 11, 12, 13, or 14.

The robot cleaner 100 may perform an operation of cleaning the region 1910 in case of determining the region 1910. The robot cleaner 100 may move the first target object 11 to a location 1911 in case of completely cleaning the region 1910.

The robot cleaner 100 may move the second target object 12 to a location 1912 in a case where the first target object 11 is moved to the location 1911.

The robot cleaner 100 may move the third target object 13 to a location 1913 in a case where the second target object 12 is moved to the location 1912.

The robot cleaner 100 may move the fourth target object 14 to a location 1914 in a case where the third target object 13 is moved to the location 1913.

A method of moving the plurality of target objects 11, 12, 13, and 14 in FIG. 19 partially uses the distributed movement type of FIG. 10. In embodiment 1000 of FIG. 10, the target objects may be moved without considering the region completely cleaned. In embodiment 1900 of FIG. 11, the distributed movement type of FIG. 10 may be used as it is while a movement location is limited to the region completely cleaned.

The operation of FIG. 19 may be used equally for the distributed movement type of FIG. 10 as well as the centralized movement type of FIG. 11 and the linear movement type of FIG. 12. In embodiment 1100 of FIG. 11, the robot cleaner 100 may determine the target location in the region completely cleaned. In embodiment 1200 of FIG. 12, the robot cleaner 100 may determine the target location in the region completely cleaned.

FIG. 20 is a flowchart for explaining an operation of identifying the additional target object 10 according to an embodiment.

Referring to FIG. 20, the robot cleaner 100 may travel with the target object 10 based on the movement path (S2040). The robot cleaner 100 may acquire the velocity change amount while traveling (S2051). The velocity change amount may include the velocity change amount of the robot cleaner 100.

The robot cleaner 100 may determine whether the velocity change amount is the threshold change amount or more (S2052). The robot cleaner 100 may perform the operations S2040, S2051, and S2052 in a case where the velocity change amount is not the threshold change amount or more (S2052-N). The robot cleaner 100 may check whether the velocity change amount is reduced to the threshold change amount or more.

The robot cleaner 100 may identify the additional target object (S2053) in a case where the velocity change amount is the threshold change amount or more (S2052-Y). The robot cleaner 100 may come into contact with the additional target object while moving the target object 10. The robot cleaner 100 may have a disturbed front view on the movement path while moving the target object 10. The reason is that the target object 10 may block at least a portion of a sensing angle of the robot cleaner 100.

The robot cleaner 100 may determine that the robot cleaner comes into contact with the additional target object in addition to the target object 10 in a case where the velocity change amount is reduced to the threshold change amount or more.

The robot cleaner 100 may stop moving the target object 10 and acquire the sensing data for identifying the additional target object (S2054). The robot cleaner 100 may be moved from the current location to a location for sensing the additional target object to acquire the sensing data.

The robot cleaner 100 may acquire the feature information of the additional target object based on the sensing data (S2055).

The robot cleaner 100 may perform an operation corresponding to the feature information of the additional target object (S2056). The operation of S2056 may include the operations S631, S632, S633, S634, S640, and S660 of FIG. 6. Omitted are their redundant descriptions.

The robot cleaner 100 may move only the target object 10 based on a determination result. The robot cleaner 100 may move the target object 10 and the additional target object together based on a determination result.

Figure 21:
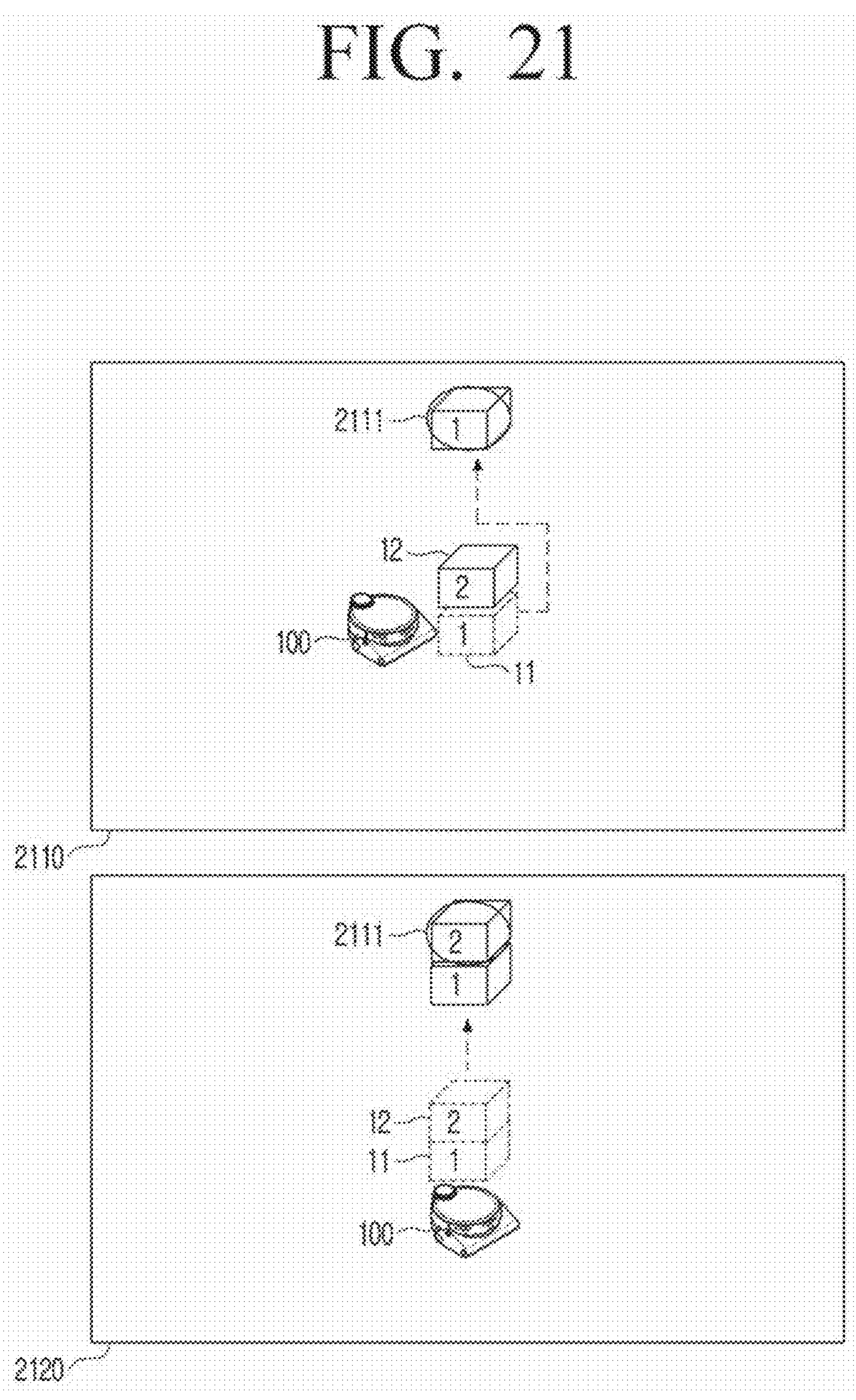
FIG. 21 is a diagram for explaining an operation of identifying an additional object according to an embodiment.

FIG. 21 is a diagram for explaining an operation of identifying the additional object 10 according to an embodiment.

Referring to embodiment 2111 of FIG. 21, the robot cleaner 100 may move the first target object 11 to a target location 2111. During the movement, the robot cleaner 100 may identify an event of its contact with the second target object 12. The robot cleaner 100 may determine that the robot cleaner comes into contact with the additional object (or the second target object 12) in a case where identifying an event where the velocity change amount is reduced to the threshold value or more.

The robot cleaner 100 may move only the first target object 11 to the target location 2111 in case of determining that the robot cleaner is unable to move the first target object 11 and the second target object 12 simultaneously.

The robot cleaner 100 may move only the first target object 11 to the target location 2111 in a case where the second target object 12 corresponds to the predetermined type (see the operation S632 of FIG. 6).

Referring to embodiment 2120 of FIG. 21, the robot cleaner 100 may move the first target object 11 and the second target object 12 together.

The robot cleaner 100 may move the first target object 11 and the second target object 12 to the target location 2111 in case of determining that the robot cleaner is able to move the first target object 11 and the second target object 12 simultaneously.

The robot cleaner 100 may move the first target object 11 and the second target object 12 to the target location 2111 in a case where the second target object 12 does not correspond to the predetermined type (see the operation S632 of FIG. 6).

FIG. 22 is a flowchart for explaining an operation of acquiring the mass information of the target object 10 according to an embodiment.

Referring to FIG. 22, the robot cleaner 100 may acquire the first sensing data (S2210). The first sensing data may include the image data.

The robot cleaner 100 may acquire first feature information of the target object 10 based on the first sensing data (S2221). The first feature information may include at least one of the size information or texture information of the target object 10.

The robot cleaner 100 may identify the type information of the target object 10 based on the first feature information (S2222).

The robot cleaner 100 may determine whether the type information of the target object 10 is included in the predetermined type (S2232). The operation S2232 may correspond to the operation S632 of FIG. 6. Omitted is its redundant description.

The predetermined type may be described as the avoidance type. The predetermined type may include the type highly required to be avoided because the target object 10 itself is impossible to be moved.

The robot cleaner 100 may travel by avoiding the target object 10 (S2233) in a case where the type information of the target object 10 is included in the predetermined type (S2232-Y). The operation S2233 may correspond to the operation S633 of FIG. 6. Omitted is its redundant description.

The robot cleaner 100 may acquire the second sensing data while traveling to move the target object 10 (S2232-1) in a case where the type information of the target object 10 is not included in the predetermined type (S2232-N). The robot cleaner 100 may acquire the second sensing data by applying the physical force to the target object 10.

The robot cleaner 100 may identify whether the target object 10 is moved (S2234). The operation S2234 may correspond to the operation S634 of FIG. 6. Omitted is its redundant description.

The robot cleaner 100 may travel by avoiding the target object 10 (S2233) in a case where the target object 10 is not moved (S2234-N).

The robot cleaner 100 may acquire second feature information of the target object 10 (S2241) based on the second sensing data in a case where the target object 10 is moved (S2234-Y). The second sensing data may include at least one of velocity data or acceleration data. The second feature information may include the mass information of the target object 10.

The robot cleaner 100 may determine its movement velocity based on the second feature information (S2242). The robot cleaner 100 may determine the target location to which the target object 10 is to be moved. The robot cleaner 100 may determine the movement path based on the target location (S2243). The robot cleaner 100 may travel based on the movement velocity and the movement path (S2260).

In the operation S2221 of FIG. 22, the first feature information is described as including the size information, the texture information, or the like. In some implementations, the first feature information may further include the mass information. The robot cleaner 100 may identify (or predict) the mass information of the target object 10 based on the first sensing data. The mass information of the target object 10 that is acquired from the first sensing data may correspond to a predicted value, and thus have low accuracy.

The robot cleaner 100 may practically acquire accurate mass information through the operation S2232-1. The robot cleaner 100 may update the mass information included in the first feature information based on the second sensing data. The second feature information may be acquired by updating the first feature information.

For example, the second feature information may include the updated mass information of the target object 10.

For example, the second feature information may include at least one of the existing size information, the existing texture information, or the updated mass information.

For example, the first sensing data may be the image data, and the second sensing data may be the velocity data, the acceleration data, or the like.

The robot cleaner 100 may update the mass information (or predicted value) of the target object 10 that is acquired from the initial first sensing data by using the second sensing data. The second sensing data may be data acquired after the force is applied to the target object 10. The updated mass information acquired by the robot cleaner 100 may be more likely to be closer to an actual mass.

Figure 23:
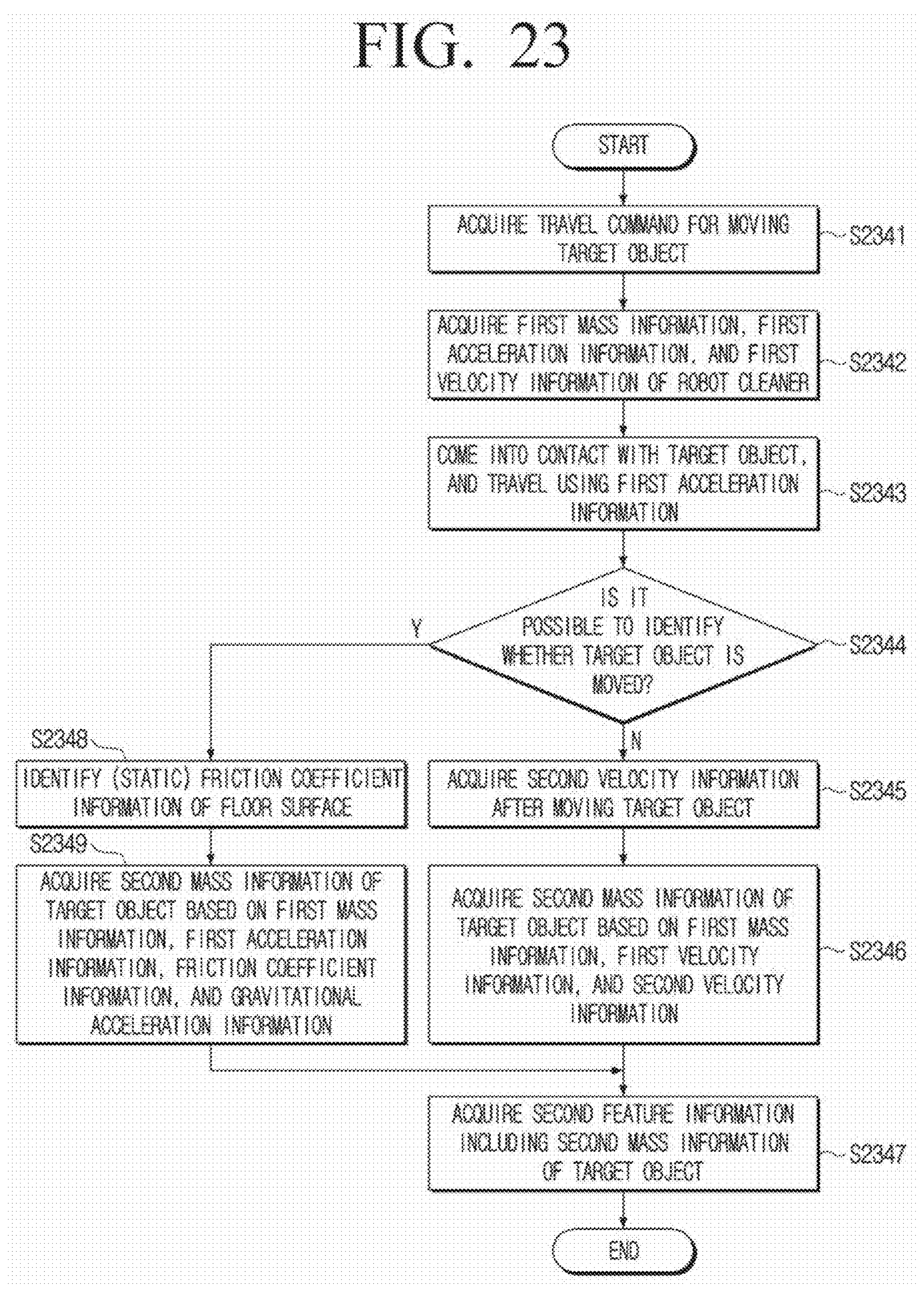
FIG. 23 is a flowchart for explaining an operation of acquiring mass information of the object according to an embodiment.

FIG. 23 is a flowchart for explaining an operation of acquiring the mass information of the target object 10 according to an embodiment.

Referring to FIG. 23, the robot cleaner 100 may acquire a travel command for moving the target object 10 (S2341). The robot cleaner 100 may acquire first mass information, first acceleration information, and first velocity information (S2342).

The robot cleaner 100 may come into contact with the target object 10, and travel using the first acceleration information (S2343).

The robot cleaner 100 may identify whether the target object 10 is moved (S2344). The robot cleaner 100 may acquire second velocity information after moving the target object 10 (S2345) in a case where the target object 10 is moved (S2344-Y).

The robot cleaner 100 may acquire second mass information of the target object 10 based on the first mass information, the first velocity information, and the second velocity information (S2346).

The robot cleaner 100 may acquire the second feature information including the second mass information of the target object 10 (S2347).

The robot cleaner 100 may identify friction coefficient information of a floor (S2348) in a case where the target object 10 is not moved (S2344-N). The friction coefficient information may include information related to a static friction coefficient. The robot cleaner 100 may identify the friction coefficient information of the floor (or the floor surface) based on the first sensing data.

The robot cleaner 100 may identify the floor object based on the image data included in the first sensing data. The robot cleaner 100 may identify a texture of the floor object. The robot cleaner 100 may acquire the friction coefficient information corresponding to the texture of the floor object. The robot cleaner 100 may pre-store the friction coefficient information corresponding to the texture.

The robot cleaner 100 may acquire the second mass information of the target object 10 based on the first mass information, the first acceleration information, the friction coefficient information, and gravitational acceleration information (S2349). The robot cleaner 100 may acquire the second feature information including the second mass information of the target object 10 (S2347).

FIG. 24 is a flowchart for explaining an operation of acquiring the mass information of the target object 10 according to an embodiment.

Operations S2441, S2442, S2443, S2444, S2445, S2446, S2447, S2448, and S2449 of FIG. 24 may correspond to the operations S2341, S2342, S2343, S2344, S2345, S2346, S2347, S2348, and S2349 of FIG. 23. Omitted are their redundant descriptions.

The robot cleaner 100 may travel based on second acceleration information after being in contact with the target object 10 (S2444-1) in a case where the target object is not moved (S2444-N). The second acceleration information may be a value greater than the first acceleration information. The robot cleaner 100 may push the target object 10 with a greater force. The robot cleaner 100 may attempt to travel to move the target object 10 based on the second acceleration information.

The robot cleaner 100 may identify whether the target object 10 is moved (S2444-2). The robot cleaner 100 may perform the operations S2445, S2446, and S2447 in a case where the target object 10 is moved (S2444-Y).

The robot cleaner 100 may identify the friction coefficient information of the floor surface (S2448) in a case where the target object 10 is not moved (S2444-N).

The robot cleaner 100 may acquire the second mass information of the target object 10 based on the first mass information, the second acceleration information, the friction coefficient information, and the gravitational acceleration information (S2449). The robot cleaner 100 may acquire the second feature information including the second mass information of the target object 10.

Figure 25:
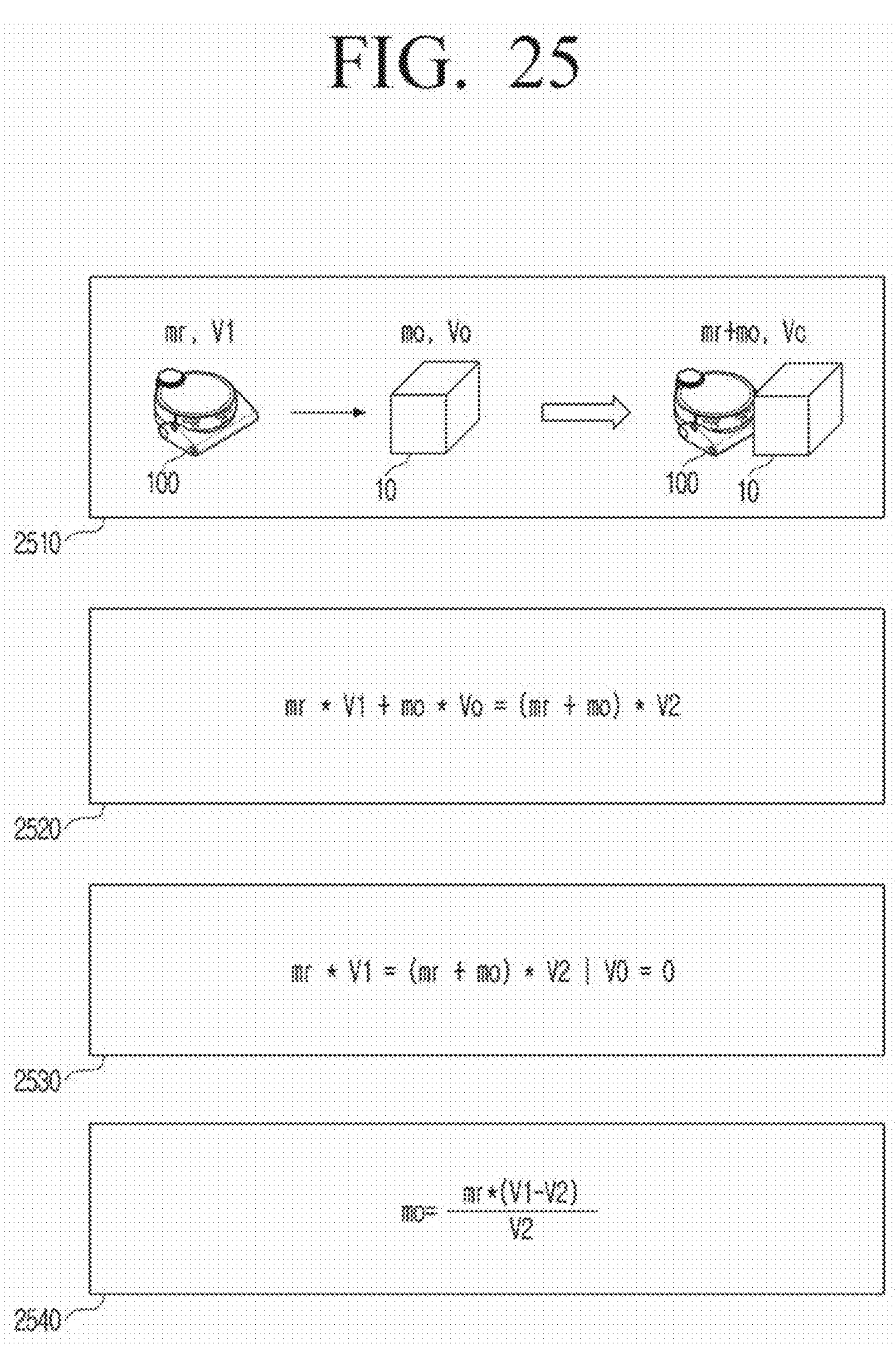
FIG. 25 is a diagram for explaining an operation of acquiring mass information of the object according to an embodiment.

FIG. 25 is a diagram for explaining an operation of acquiring mass information of the object according to an embodiment.

FIG. 25 shows a process of calculating a mass of the target object 10 in a situation where the target object 10 is moved.

Embodiment 2510 of FIG. 25 indicates that the robot cleaner 100 may have a first mass mr and the robot cleaner 100 has a first velocity V1. The robot cleaner 100 may move the target object 10, which has a second mass mo and is stationary (e.g., velocity Vo=zero). After coming into contact with the target object 10, the robot cleaner 100 may move the target object 10. A velocity at which the robot cleaner 100 and the target object 10 are moved together may be a second velocity V2.

A left side of Equation 2520 of FIG. 25 indicates a momentum in a situation before the robot cleaner 100 moves the target object 10. A right side of Equation 2520 indicates a momentum in a situation where the robot cleaner 100 and the target object 10 are moved together. Assume that the momentum is conserved.

Equation 2530 of FIG. 25 shows a result of applying Equation 2520 to Vo=zero, which indicates that the target object 10 is stationary.

Equation 2540 of FIG. 25 indicates a calculation process for acquiring the second mass mo of the target object 10. The robot cleaner 100 may calculate the second mass mo of the target object 10 based on the first mass mr, the first speed V1, and the second speed V2.

Figure 26:
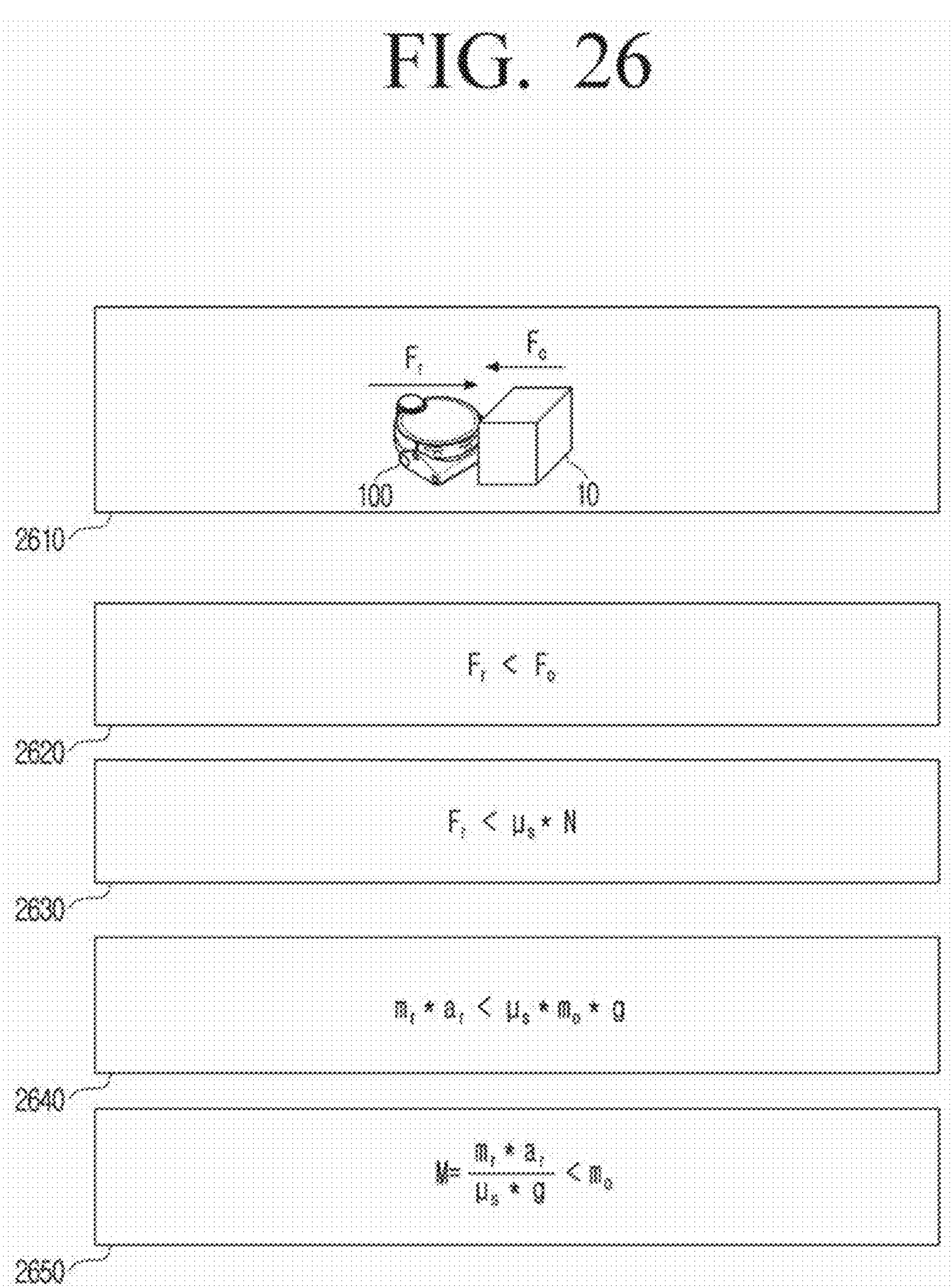
FIG. 26 is a diagram for explaining an operation of acquiring mass information of the object according to an embodiment.

FIG. 26 is a diagram for explaining an operation of acquiring the mass information of the target object 10 according to an embodiment.

FIG. 26 shows a process of calculating the mass of the target object 10 in the situation where the target object 10 is not moved.

Embodiment 2610 of FIG. 26 shows a situation where the target object 10 is not moved even though the robot cleaner 100 applies a friction (Fr) force to the target object 10. Assume that a friction force of Fo acts in an opposite direction.

Equation 2620 of FIG. 26 indicates that the force Fr provided by the robot cleaner 100 to the target object 10 is less than the friction force Fo.

Equation 2620 of FIG. 26 indicates that the friction force Fo is a product of a static friction coefficient us and a normal force N.

In Equation 2640 of FIG. 26, the force Fr pushing the target object 10 may be indicated as the product of the first mass mr and a first acceleration ar. The normal force N may be indicated as the product of the second mass mo and gravitational acceleration g of the target object 10.

Equation 2650 of FIG. 26 indicates that the second mass mo of the target object 10 is greater than a specific value M. The specific value M may be calculated based on the first mass mr, the first acceleration ar, the static friction coefficient us, and the gravitational acceleration g. The specific value M may be (mr*ar)/(us*g).

According to an embodiment, the robot cleaner 100 may determine the second mass mo of the target object 10 as the specific value M. The second mass mo of the target object 10 may be physically greater than the specific value M. However, for convenience of calculation, the robot cleaner 100 may determine the second mass mo of the target object 10 as the specific value M.

According to an embodiment, the robot cleaner 100 may determine the second mass mo of the target object 10 as the sum of the specific value M and a constant. The constant may be a predetermined constant.

FIG. 27 is a flowchart for explaining an operation of determining whether to move the target object 10 according to an embodiment.

Referring to FIG. 27, the robot cleaner 100 may acquire the sensing data (S2710). The robot cleaner 100 may identify the target object 10 based on the sensing data (S2720).

The robot cleaner 100 may determine the type of the identified target object 10 (S2731). The robot cleaner 100 may travel by avoiding the target object 10 (S2732) in a case where the type is not identified (S2731-N).

The robot cleaner 100 may determine whether the type of the target object 10 is included in the predetermined type (S2733) in a case where the type is identified (S2731-Y).

The robot cleaner 100 may travel by avoiding the target object 10 (S2732) in a case where the type of the target object 10 is included in the predetermined type (S2733-Y).

The robot cleaner 100 may acquire the feature information of the target object 10 and the feature information of the floor surface, based on the sensing data (S2734) in a case where the type of the target object 10 is not included in the predetermined type (S2733-N). The feature information of the target object 10 may include its size, mass, texture, or the like. The feature information of the floor surface may include its texture.

The robot cleaner 100 may travel to move the target object 10 (S2735). The robot cleaner 100 may identify whether the target object 10 is moved (S2736).

The robot cleaner 100 may travel by avoiding the target object 10 (S2732) in a case where the target object 10 is not moved (S2736-N).

The robot cleaner 100 may determine the target location to which the target object 10 is to be moved (S2740) in a case where the target object 10 is moved (S2736-Y). The robot cleaner 100 may travel to move the target object 10 to the target location (S2760).

The operations of FIG. 27 may indicate an embodiment where an order of the operations of FIG. 6 is partially changed. Some operations of FIG. 27 may correspond to some operations of FIG. 6. Omitted are their redundant descriptions.

FIG. 28 is a flowchart for explaining a controlling method of a robot cleaner 100 according to an embodiment.

Referring to FIG. 28, the controlling method of a robot cleaner 100 may include: identifying a plurality of objects based on sensing data; identifying a target object located on a travel surface of the robot cleaner 100 among the plurality of objects; acquiring power information indicating remaining power of the robot cleaner 100; determining whether to avoid the target object based on a result of comparing the power information with a threshold power value; traveling to avoid the target object in a case where the power information is less than the threshold power value; acquiring feature information of the target object based on the sensing data in a case where the power information is the threshold power value or more; acquiring type information of the target object based on the feature information; traveling by avoiding the target object in a case where the type information includes a predetermined type; and traveling based on a movement path for moving the target object to a target location in a case where the type information does not include the predetermined type.

The controlling method may further include: traveling based on a test mode where the robot cleaner comes into contact with the target object at a predetermined acceleration in a case where the type information does not include the predetermined type; and determining the movement path for moving the target object to the target location, and traveling based on a movement mode of moving the target object along the movement path in a case where the target object is moved based on the test mode.

The controlling method may further include traveling by avoiding the target object in a case where the target object is not moved based on the test mode.

In the acquiring of the feature information, the feature information including at least one of the size information, mass information, or texture information of the target object may be acquired based on the sensing data, and in the acquiring of the type information, the type information for determining a movement possibility of the target object may be acquired based on the feature information.

The controlling method may further include identifying the type information as a non-movable type in a case where a height of the target object is a threshold height or more based on the size information of the target object, and the predetermined type may include the non-movable type.

The controlling method may further include identifying the type information as the non-movable type in a case where a mass of the target object is a threshold mass or more based on the mass information of the target object, and the predetermined type may include the non-movable type.

The controlling method may further include identifying the type information as the non-movable type in a case where the target object is identified as having a glass texture based on the texture information of the target object, and the predetermined type may include the non-movable type.

The movement path may be a first movement path, and the controlling method may further include: traveling to move the target object to a temporary location in a case where the power information is less than the threshold power value; traveling to a charging location without the target object in a case where the target object is moved to the temporary location; changing the first movement path to a second movement path to move the target object from the temporary location to the target location in a case where charging is completed; and traveling based on the second movement path.

The controlling method may further include: determining a movement type corresponding to the power information among the plurality of the movement types, and determining the target location based on the movement type.

In the traveling based on the movement path, the traveling may be performed to clean the movement path without the target object in a case where the type information does not include the predetermined type, and the traveling may be performed to move the target object to the target location based on the movement path completely cleaned.

The methods according to the various embodiments of the present disclosure described above may be implemented in the form of an application which may be installed in a conventional robot cleaner.

In addition, the methods according to the various embodiments of the present disclosure described above may be implemented only by the software upgrade or hardware upgrade of the conventional robot cleaner.

In addition, the various embodiments of the present disclosure described above may be performed through an embedded server included in the robot cleaner, or an external server of at least one of the robot cleaner or a display device.

According to an embodiment of the present disclosure, the various embodiments described above may be implemented in software including an instruction stored in a machine-readable storage medium (for example, a computer-readable storage medium). A machine may be a device which may invoke the stored instruction from the storage medium, be operated based on the invoked instruction, and include the robot cleaner in the disclosed embodiments. In a case where the instruction is executed by the processor, the processor may perform a function corresponding to the instruction directly or by using other components under control of the processor. The instruction may include a code provided or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

In addition, according to an embodiment of the present disclosure, the methods in the various embodiments described above may be provided by being included in a computer program product. The computer program product may be traded as a product between a seller and a purchaser. The computer program product may be distributed in the form of a storage medium (for example, a compact disc read only memory (CD-ROM)) that may be read by the machine or online through an application store (for example, PlayStore™). In case of the online distribution, at least a portion of the computer program product may be at least temporarily stored in a storage medium such as a memory of a server of a manufacturer, a server of an application store or a relay server, or be temporarily provided.

In addition, each component (e.g., module or program) in the various embodiments described above may include one entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner. Operations performed by the modules, the programs, or other components in the various embodiments may be executed in a sequential manner, a parallel manner, an iterative manner, or a heuristic manner, at least some of the operations may be performed in a different order or be omitted, or other operations may be added.

Although the embodiments are shown and described in the present disclosure as above, the present disclosure is not limited to the above-mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. A robot cleaner comprising:

a sensor;

at least one memory storing one or more instructions; and at least one processor, wherein the one or more instructions, when executed by the at least one processor, cause the robot cleaner to:

identify a plurality of objects based on sensing data acquired through the sensor, identify a target object located on a travel surface of the robot cleaner among the plurality of objects, acquire power information indicating remaining power of the robot cleaner, compare the remaining power with a threshold power value, based on the remaining power being less than the threshold power value, control the robot cleaner to travel to avoid the target object, based on the remaining power being greater than or equal to the threshold power value, acquire feature information of the target object based on the sensing data, acquire type information of the target object based on the feature information, determine whether the type information includes a predetermined type, based on the type information including the predetermined type, control the robot cleaner to travel to avoid the target object, and based on the type information not including the predetermined type, control the robot cleaner to travel based on a movement path for moving the target object to a target location.

2. The robot cleaner of claim 1, wherein the one or more instructions, when executed by the at least one processor, further cause the robot cleaner to:

based on the type information not including the predetermined type, control the robot cleaner to travel according to a test mode where the robot cleaner comes into contact with the target object at a predetermined acceleration, and based on the robot cleaner moving the target object while traveling in the test mode, determine the movement path for moving the target object to the target location, and control the robot cleaner to travel based on a movement mode of moving the target object along the movement path.

3. The robot cleaner of claim 2, wherein the one or more instructions, when executed by the at least one processor, cause the robot cleaner to:

based on the robot cleaner being unable to move the target object while traveling in the test mode, control the robot cleaner to travel to avoid the target object.

4. The robot cleaner of claim 1, wherein the feature information comprises at least one of size information of the target object, mass information of the target object, or texture information of the target object, and wherein the type information comprises information regarding a possibility of moving the target object.

5. The robot cleaner of claim 4, wherein the size information comprises a height of the target object, and wherein the one or more instructions, when executed by the at least one processor, further cause the robot cleaner to:

based on the height of the target object being equal to or greater than a threshold height, identify the type information as including the predetermined type.

6. The robot cleaner of claim 4, wherein the mass information comprises a mass of the target object, and wherein the one or more instructions, when executed by the at least one processor, further cause the robot cleaner to:

based on the mass of the target object being greater than or equal to a threshold mass, identify the type information as including the predetermined type.

7. The robot cleaner of claim 4, wherein the texture information comprises a texture of the target object, and wherein the one or more instructions, when executed by the at least one processor, further cause the robot cleaner to:

based on the texture of the target object being a glass texture, identify the type information as comprising the predetermined type.

8. The robot cleaner of claim 1, wherein the movement path is a first movement path, and wherein the one or more instructions, when executed by the at least one processor, further cause the robot cleaner to:

based on the remaining power being less than a threshold power level, control the robot cleaner to travel to move the target object to a temporary location, based on the target object being moved to the temporary location, control the robot cleaner to travel to a charging location without the target object, upon completion of a charging operation, change the first movement path to a second movement path to move the target object from the temporary location to the target location, and travel based on the second movement path.

9. The robot cleaner of claim 1, wherein the one or more instructions, when executed by the at least one processor, further cause the robot cleaner to:

identify a movement type corresponding to the remaining power from among a plurality of movement types stored in the at least one memory, and determine the target location based on the movement type.

10. The robot cleaner of claim 1, wherein the one or more instructions, when executed by the at least one processor, further cause the robot cleaner to:

based on the type information not including the predetermined type, control the robot cleaner to travel to clean the movement path without the target object, and upon completion of cleaning the movement path, control the robot cleaner to travel to move the target object to the target location along the movement path.

11. A method of controlling a robot cleaner, the method comprising:

identifying a plurality of objects based on sensing data;

identifying a target object located on a travel surface of the robot cleaner among the plurality of objects;

acquiring power information indicating remaining power of the robot cleaner;

comparing the remaining power with a threshold power value;

based on the remaining power being less than the threshold power value, traveling to avoid the target object;

based on the remaining power being greater than or equal to the threshold power value, acquiring feature information of the target object based on the sensing data;

acquiring type information of the target object based on the feature information;

determining whether the type information includes a predetermined type;

based on the type information including a predetermined type, traveling to avoid the target object; and based on the type information not including the predetermined type, traveling based on a movement path for moving the target object to a target location.

12. The method of claim 11, further comprising:

based on the type information not including the predetermined type, traveling according to a test mode where the robot cleaner comes into contact with the target object at a predetermined acceleration; and based on the robot cleaner moving the target object while traveling in the test mode, determining the movement path for moving the target object to the target location, and traveling based on a movement mode of moving the target object along the movement path.

13. The method of claim 12, further comprising:

based on the robot cleaner being unable to move the target object while traveling in the test mode, traveling to avoid the target object.

14. The method of claim 11, wherein the feature information comprises at least one of size information of the target object, mass information of the target object, or texture information of the target object, and wherein the type information comprises information regarding a possibility of moving the target object.

15. The method of claim 14, wherein the size information comprises a height of the target object, and wherein the method further comprises:

based on the height of the target object being equal to or greater than a threshold height, identifying the type information as including the predetermined type.

16. The method of claim 14, wherein the mass information comprises a mass of the target object, and wherein the method further comprises:

based on the mass of the target object being greater than or equal to a threshold mass, identifying the type information as including the predetermined type.

17. The method of claim 14, wherein the texture information comprises a texture of the target object, and wherein the method further comprises:

based on the texture of the target object being a glass texture, identifying the type information as comprising the predetermined type.

18. The method of claim 11, wherein the movement path is a first movement path, and wherein the method further comprises:

based on the remaining power being less than a threshold power level, traveling to move the target object to a temporary location;

based on the target object being moved to the temporary location, traveling to a charging location without the target object;

upon completion of a charging operation, changing the first movement path to a second movement path to move the target object from the temporary location to the target location; and traveling based on the second movement path.

19. The method of claim 11, further comprising:

identifying a movement type corresponding to the remaining power from among a plurality of movement types stored in the robot cleaner; and determining the target location based on the movement type.

20. The method of claim 11, further comprising:

based on the type information not including the predetermined type, traveling to clean the movement path without the target object; and upon completion of cleaning the movement path, traveling to move the target object to the target location along the movement path.

* * * * *